(12) United States Patent
Shaotran

(10) Patent No.: US 11,840,155 B2
(45) Date of Patent: Dec. 12, 2023

(54) BATTERY PRECONDITIONING MANAGEMENT FOR VEHICLES OF A DISTRIBUTED NETWORK

(71) Applicant: BP PULSE FLEET NORTH AMERICA INC., Mountain View, CA (US)

(72) Inventor: Ethan Shaotran, Palo Alto, CA (US)

(73) Assignee: BP PULSE FLEET NORTH AMERICA INC., Mountain View, CA (US)

(*) Notice: Subject to any disclaimer, the term of this patent is extended or adjusted under 35 U.S.C. 154(b) by 5 days.

(21) Appl. No.: 17/365,942

(22) Filed: Jul. 1, 2021

(65) Prior Publication Data

US 2023/0001818 A1   Jan. 5, 2023

(51) Int. Cl.
| | | |
|---|---|---|
| *H02J 7/00* | (2006.01) | |
| *B60L 53/66* | (2019.01) | |
| *B60L 58/24* | (2019.01) | |
| *B60L 53/30* | (2019.01) | |
| *B60L 53/62* | (2019.01) | |

(52) U.S. Cl.
CPC ............ *B60L 53/66* (2019.02); *B60L 53/305* (2019.02); *B60L 53/62* (2019.02); *B60L 58/24* (2019.02); *H02J 7/00032* (2020.01); *B60L 2240/80* (2013.01); *B60L 2260/44* (2013.01)

(58) Field of Classification Search
CPC ........ B60L 53/66; B60L 53/305; B60L 58/24; B60L 2240/80; B60L 2260/44
USPC .............................................. 320/109; 701/22
See application file for complete search history.

(56) References Cited

U.S. PATENT DOCUMENTS

| | | | |
|---|---|---|---|
| 7,629,773 B2 | 12/2009 | Eberhard et al. | |
| 7,755,329 B2 | 7/2010 | Kohn et al. | |
| 8,336,319 B2 | 12/2012 | Johnston et al. | |
| 8,620,506 B2 | 12/2013 | Kummer et al. | |
| 9,643,510 B2 | 5/2017 | Liu | |

(Continued)

FOREIGN PATENT DOCUMENTS

| | | |
|---|---|---|
| EP | 2803549 A1 | 11/2014 |
| WO | 2018009448 A1 | 1/2018 |

OTHER PUBLICATIONS

International Search Report and Written Opinion for PCT Application No. PCT/US2022/035583 dated Oct. 26, 2022.

(Continued)

*Primary Examiner* — Zixuan Zhou
(74) *Attorney, Agent, or Firm* — Dorsey & Whitney LLP

(57) ABSTRACT

A method of controlling battery preconditioning in a vehicle includes determining a first preconditioning characteristic of a first battery of a first vehicle relative to a charging station. The method further includes transmitting the first preconditioning characteristic. The method further includes receiving, from a second vehicle, a second preconditioning characteristic of a second battery relative to the charging station. The method further includes comparing the first preconditioning characteristic and the second preconditioning characteristic to determine a preconditioning ranking for the first vehicle and the second vehicle. The method further includes determining a queue of the first and second vehicles for the charging station using the preconditioning ranking of the first and second vehicles.

19 Claims, 16 Drawing Sheets

(56) References Cited

U.S. PATENT DOCUMENTS

| | | |
|---|---|---|
| 10,300,808 B2 | 5/2019 | Newman et al. |
| 10,800,287 B2 | 10/2020 | Vallender et al. |
| 10,870,368 B2 | 12/2020 | Ing et al. |
| 2009/0210357 A1 | 8/2009 | Pudar et al. |
| 2011/0241824 A1 | 10/2011 | Uesugi |
| 2012/0106544 A1 | 5/2012 | Yousefi et al. |
| 2014/0028254 A1* | 1/2014 | Shane ................... B60L 58/12 |
| | | 320/109 |
| 2014/0125279 A1 | 5/2014 | Juhasz |
| 2014/0326430 A1 | 11/2014 | Carpenter et al. |
| 2015/0115895 A1 | 4/2015 | Kim |
| 2017/0008375 A1 | 1/2017 | Blatchley et al. |
| 2017/0246962 A1* | 8/2017 | Weber ................... B60L 53/12 |
| 2018/0189683 A1 | 7/2018 | Newman |
| 2020/0076020 A1 | 3/2020 | Ogaki et al. |
| 2020/0156499 A1 | 5/2020 | Huelz et al. |
| 2020/0171965 A1 | 6/2020 | Ko |
| 2020/0412160 A1 | 12/2020 | Manzoor et al. |
| 2021/0086651 A1 | 3/2021 | Maeda et al. |
| 2021/0276447 A1 | 9/2021 | Kumar et al. |

OTHER PUBLICATIONS

International Search Report and Written Opinion for PCT Application No. PCT/US2022/035587 dated Oct. 26, 2022.
International Search Report and Written Opinion of PCT Application No. PCT/US2022/035578 dated Oct. 18, 2022.

* cited by examiner

BATTERY PRECONDITIONING MANAGEMENT FOR VEHICLES OF A DISTRIBUTED NETWORK

FIELD

The described embodiments relate generally to systems and techniques for preconditioning a battery of an electric vehicle.

BACKGROUND

Electric vehicles may use a battery to operate an electric motor and/or other components of the vehicle. While these operations may deplete the battery, the battery may be recharged and subsequently used to operate the components of the electric vehicle. Battery temperature may influence battery recharging. As one example, an elevated battery temperature may allow the battery to be recharged more quickly as compared with a lower battery temperature. Electric vehicles may include systems to modify or "precondition" the battery temperature for recharging. Conventional systems may modify battery temperature prior to arrival at a charging station. However, in a fleet of electrical vehicles en route to a limited amount of available chargers, preconditioning the battery of a particular vehicle in conventional preconditioning control systems often fails to account for the conditions of the other vehicles of the fleet. This can lead to downtime and inefficiencies at the charging station, for example, wherein a battery of a first vehicle may be unable to begin charging until a preconditioning operation is complete or a vehicle that has preconditioned and is ready to charge has to wait for another vehicle to finish charging first. As such, there is a constant need for systems and techniques to facilitate battery preconditioning in electric vehicles.

SUMMARY

Examples of the present invention are directed to systems and methods for coordinating a vehicles, such as vehicles over a mesh network, using preconditioning characteristics from vehicles of the fleet.

In one example, a method of controlling battery preconditioning in a vehicle is disclosed. The method includes determining a first preconditioning characteristic of a first battery of a first vehicle relative to a charging station. The method further includes transmitting the first preconditioning characteristic. The method further includes, receiving, from a second vehicle, a second preconditioning characteristic of a second battery relative to the charging station. The method further includes comparing the first preconditioning characteristic and the second preconditioning characteristic to determine a preconditioning ranking for the first vehicle and the second vehicle. The method further includes determining a queue of the first and second vehicles for the charging station using the preconditioning ranking of the first and second vehicles.

In another example, the method further includes transmitting a first queue confirmation message comprising information indicative of the queue determined by the first vehicle. In this regard, the method may further include receiving a second queue confirmation message from the second vehicle. The second queue confirmation message comprising information indicative of a queue determined by the second vehicle. In some cases, the method may then further include resolving a discrepancy between the queue determined by the first vehicle and the queue determined by the second vehicle.

In another example, the preconditioning ranking of the first vehicle corresponds to the first vehicle having a higher priority over the second vehicle for usage of the charging station. In this regard, the method may further include causing the first vehicle to initiate a preconditioning operation for the first battery before the second vehicle initiates a preconditioning operation for the second battery.

In another example, the first or second preconditioning characteristic may be indicative of a minimum amount of time required to recharge the respective first or second battery at the charging station after a preconditioning operation. Determining of the preconditioning ranking may further include, in response to the first preconditioning characteristic being less than the second preconditioning characteristic, determining the preconditioning ranking of the first vehicle is prioritized over the preconditioning ranking of the second vehicle. Determining of the preconditioning ranking may further include, in response to the second preconditioning characteristic being less than the first preconditioning characteristic, determining the preconditioning ranking of the second vehicle is prioritized over the preconditioning ranking of the first vehicle. In this regard, the first or the second preconditioning ranking may include a preconditioning time of the respective first or second battery, an estimated time of arrival of the respective first or second vehicle to the charging station, or an estimated charge time of the respective first or second battery.

In another example, transmitting the first preconditioning characteristic may include transmitting the first preconditioning characteristic to the second vehicle. In some cases, transmitting the first preconditioning characteristic may include transmitting the first preconditioning characteristic to a plurality of additional vehicles within a predetermined radius of the charging station.

In another example, the first preconditioning characteristic may be transmitted periodically. Further, the second vehicle may be a charging vehicle at the charging station and the second preconditioning characteristic may be accompanied by information indicative of a time to complete a charging of the second battery at the charging station. In turn, the method may further include causing the first vehicle to initiate a preconditioning of the first battery based on the information indicative of the time to complete the charging of the second battery.

In another embodiment, the method further includes applying a set of override rules to the queue to modify the queue determined by the first vehicle.

In another example, a system is disclosed. The system includes a plurality of vehicles communicatively coupled over a mesh network. One or more vehicles of the plurality of vehicles has a battery. The system further includes a charging station configured to charge the battery of the one or more vehicles. The system further includes a fleet management system operated at least partially by a first vehicle of the plurality of vehicles and comprising a non-transitory computer-readable media encoded with instructions which, when executed by one or more processing elements of the fleet management system, cause the system to determine a first preconditioning characteristic of a first battery of the first vehicle relative to the charging station. The instructions further cause the system to receive, from a second vehicle, a second preconditioning characteristic of a second battery relative to the charging station. The instructions further cause the system to determine a queue of the first and second vehicles for the charging station using the preconditioning ranking of the first and second vehicles.

In another example, the instructions may further cause the system to compare the first preconditioning characteristic and the second preconditioning characteristic to determine a preconditioning ranking. In this regard, determining the queue may further include using the preconditioning ranking to prioritize the first or the second vehicle at the charging station. In some cases, the instructions further cause the system to determine an override priority of the first vehicle and second vehicle. Accordingly, the instructions may further cause the system to update the queue based on the override priority.

In another example, updating the queue may include prioritizing usage of the charging station for the one of the first vehicle or the second vehicle with a higher override priority, notwithstanding the respective preconditioning ranking of the first and second vehicles. In some cases, determining the override priority further comprises applying a set of hardcoded rules to the queue.

In another example, a method of controlling battery preconditioning in a vehicle is disclosed. The method includes determining, at a first vehicle, a preconditioning ranking for the first vehicle and a second vehicle by comparing a first preconditioning characteristic of a first battery of the first vehicle and a second preconditioning characteristic of a second battery of a second vehicle. The method further includes determining a queue of the first and second vehicles for a charging station using the preconditioning ranking of the first and second vehicles. the method further includes determining an override priority of the first vehicle and second vehicle. The method further includes updating the queue based on the override priority.

In another example, the method may further include receiving the second preconditioning characteristic from the second vehicle. The method may further include receiving routing factors from the second vehicle comprising traffic information, battery consumption information, and temperature information associated with the second vehicle. In some cases, the method may further include determining the first preconditioning characteristic using the received routing factors from the second vehicle.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
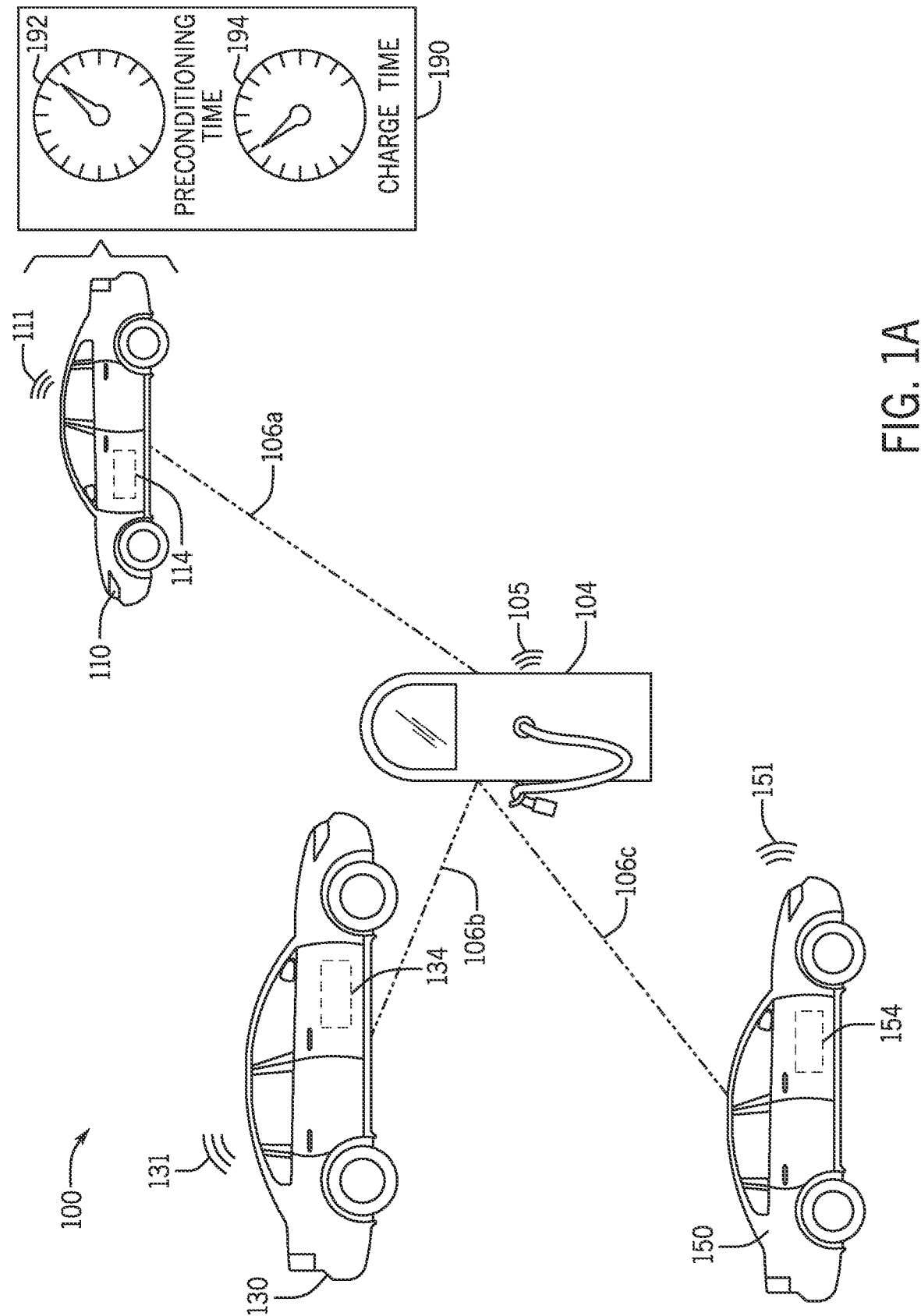
FIG. 1A depicts a schematic view of a system including vehicles traveling to a charging station.

The description that follows includes sample systems, methods, and apparatuses that embody various elements of the present disclosure. However, it should be understood that the described disclosure may be practiced in a variety of forms in addition to those described herein.

The following disclosure relates generally to systems and techniques for monitoring, managing, and/or controlling preconditioning of a battery of a vehicle in a fleet of electric vehicles. A "fleet" of electric vehicles may include substantially any multi-vehicle system. The vehicles of the multi-vehicle system may be vehicles of a fleet, such as a fleet of vehicles for a particular carrier or for delivery services (e.g., a fleet of delivery vehicles for a particular grocery store, a fleet of taxi-type vehicles for ride services, and so on). Additionally or alternatively, the fleet of vehicles may include substantially any grouping of vehicles that may be configured to communicate with one another. As one example, and as described herein, a multi-vehicle system may be defined by a group of vehicles that are within geographic proximity to a charging station. In some cases, a multi-vehicle system may include vehicles of both a fleet in combination with other electric vehicles.

The vehicles of the multi-vehicle system may be electric vehicles that use a battery as an energy source for an electric motor. For example, the vehicles may be plug-in electric vehicles, hybrid electric vehicles, and/or vehicle types. Accordingly, the battery may require recharging after a period of use. Battery temperature may influence recharging. For example, the recharging speed, recharging efficiency, and/or total accepted charge may be based, in part, on battery temperature when charging starts, such as upon arrival of the electric vehicle at a charging station and/or other system that is configured to recharge the battery. Modifying the temperature of a battery of an electric vehicle in preparation of battery recharging is often referred to as "preconditioning." The battery temperature may be modified or preconditioned in order to cause the battery to exhibit or otherwise move toward a target preconditioning battery temperature. The target preconditioning battery temperature may be a predetermined temperature of the battery at which the battery exhibits desired charging performance, such as exhibiting a desired recharging speed and/or efficiency.

In the case of a multi-vehicle systems, multiple vehicles may be en route to a limited amount of available charging stations. Preconditioning the battery of a particular vehicle without consideration of other vehicles of the fleet may produce suboptimal outcomes, including prolonged delays at a charging station and/or excess resource usage. For example, it may necessary for a vehicle to wait at the charging station for a period of time prior to charging (e.g., where the charging station is occupied by another fleet vehicle). Preconditioning the battery too early may expend excess resources as the vehicle maintains the target preconditioning temperature while waiting for the charging station to become available. Likewise, preconditioning the battery too late may cause delays as the vehicle preconditions the battery while the charging station remains unoccupied or otherwise used inefficiently (i.e., charging is slower than would be possible if the battery had been properly preconditioned). Such delays may multiply and cause substantial vehicle downtime that hinders the efficiency of the fleet.

The systems and techniques of the present disclosure may mitigate such hindrances, in part, by allowing for the coordination of battery preconditioning in one or more vehicles of a multi-vehicle system. Broadly, the present disclosure may allow for vehicle prioritization at a charging station (or group of charging stations) and control of battery preconditioning for the vehicles. In one example, use of the charging station may be prioritized for vehicles that are in a state, condition, or configuration in which the vehicle (relative to other vehicles of the system) can return to service most quickly or efficiently. In this regard, factors such as estimated preconditioning time, battery temperature, estimated time to the charging station, and estimated charge time, among other factors, may be compared across vehicles of the multi-vehicle system to determine an initial or "indirect" prioritization across the vehicles of the system. Additionally or alternatively, the system may allow for the "direct" prioritization of the vehicles, such as with the use of hardcoded rules and/or manual inputs or routines that are configured to modify the priority of the vehicle at the charging station, notwithstanding the preconditioning factors. Additionally or alternatively, the system may also allow for the modification of vehicle prioritization based on the availability of the charging station(s) at the destination. In some cases, this may also help conserve resources by allowing vehicles to precondition based on the availability of the charging station.

In one example, a method is disclosed for ranking vehicles according to preconditioning characteristics of the vehicles or otherwise comparing vehicles of the multi-vehicle system to determine the indirect prioritization. To illustrate, one or more or all vehicles of the multi-vehicle system may have a preconditioning characteristic. As used herein, "preconditioning characteristic" may broadly refer to any characteristic, data point, factor, sensor reading, configuration, or similar status associated with preconditioning of the battery of the electric vehicle, charging the battery of the electric vehicle, and/or the relationship between the vehicle and a given charging station. In some embodiments, the preconditioning characteristic may refer to any characteristic or factor affecting the time and efficiency of the vehicle to return to service in consideration of the preconditioning of the battery of the vehicle. As described herein, the preconditioning characteristic may include, among other items, an estimated charge time of the battery of the electric vehicle to fully charge, a preconditioning time of the battery, and/or an estimated of arrival time of the vehicle to the charging station. These and other factors may be analyzed in order to determine the preconditioning characteristic for multiple vehicles of the multi-vehicle system. In some cases, the preconditioning characteristic may represent a score or metric that is indicative of the time in which a particular vehicle may return to service in light of the time constraints of preconditioning, travel of the vehicle to the charging station, the vehicle's status and prioritization relative to other vehicles at or approaching the charging station, and the amount of time needed for charging.

Example methods disclosed herein may include comparing the preconditioning characteristic of multiple vehicles of the multi-vehicle system in order to determine a ranking of the vehicles for a given charging station. To illustrate, a computing system, which may operate remote from the vehicles, may receive a first preconditioning characteristic of a first battery from a first vehicle of the fleet of vehicles. The computing system may further receive a second preconditioning characteristic of a second battery from a second vehicle of the fleet of vehicles. The computing system may further compare the first and second preconditioning characteristics to determine a preconditioning ranking for the first vehicle and the second vehicle at the charging station. In the illustrative method, the preconditioning characteristic may be indicative of a minimum amount of time required to recharge the respective first and second battery at the charging station after a preconditioning operation. In this regard, the vehicle with the preconditioning characteristic having the lowest value may be prioritized or have a higher ranking at the charging station than other vehicles.

In another example, methods disclosed herein include determining a queue or charging assignment of vehicles for the charging station using the preconditioning ranking. In one example, the preconditioning ranking (or "priority ranking") may correspond to an ordered list of vehicles based on the preconditioning characteristics of the vehicles. The queue of vehicles may therefore correspond to an order of the vehicles for charging at the charging station. In some cases, the queue of vehicles may be the same as the preconditioning ranking of vehicles. In other cases, the systems techniques disclosed herein may allow for the queue to be based on the preconditioning ranking, and updated and modified as needed based on a set of hardcoded rules and/or user inputs. In this regard, the method may include determining an override priority that prioritizes one of the first or second vehicles, and updating the queue based on the override priority. The override priority may allow for the direct prioritization of the vehicles, such as by a manager of a fleet and other criteria the prioritizes a first vehicle over a second (e.g., prioritizing an emergency vehicle at a charging station over a commercial or private vehicle).

The queue may be further updated, according to the methods disclosed herein, based on the status of charging station(s) and vehicles at a given destination. To illustrate, the availability of a charging station may influence the priority of particular assigned vehicles at the station. Where a particular charging station is occupied by a first vehicle, a second vehicle may have a status indicating a longer time to return to service, notwithstanding the preconditioning status of the second vehicle. Further, where a charging station is occupied by a first vehicle, the second vehicle may be restricted from preconditioning too early in order to conserve its system resources. The charging station may be one of multiple charging stations at a charging depot. The queue may therefore be updated to include not only a prioritization or order of the vehicles for charging, but also an assignment of the vehicles at particular charging stations of the charging depot, based on the availability and preconditioning factors, as described herein.

Further, disclosed herein are methods for controlling preconditioning in one or more of the vehicles based in the preconditioning ranking and/or queue. For example, the preconditioning ranking and/or queue may be determined as described generally above. A given vehicle of the multi-vehicle system may initiate a preconditioning operation based on the position of the respective vehicle in the ranking or queue. The preconditioning operation may be based on a time at which the vehicle anticipates initiating charging at the charging station, in light of the ranking or queue. In some cases, the preconditioning operation may occur while the vehicle is en route to the charging station such that the battery of the vehicle reaches a target preconditioning temperature generally around when the charging station is available for charging the given vehicle. Route-based preconditioning and other factors of the vehicle may be used to determine a time at which the vehicle initiates preconditioning such that the battery reaches the target preconditioning temperature at around the time of availability of the charging station. One such route-based preconditioning technique and system is described in U.S. patent application Ser. No. 17/365,305, entitled "ROUTE BASED BATTERY PRECONDITIONING SYSTEMS AND METHODS," which is hereby incorporated by reference in its entirety. In other cases, the vehicle may begin the preconditioning operation at the charging station, for example, while waiting for the charging station to become available.

As described herein, a non-transitory computer-readable medium may be encoded with instructions which, when executed by one or more processing elements, cause the vehicle or remote system to perform one or more or all of the techniques described herein. The instructions may be elements of a fleet management system. The fleet management system may operate or execute on a server that may be remote from the vehicles.

In other cases, the fleet management system may operate at least partially on individual vehicles of the multi-vehicle system. The fleet management system may therefore facilitate vehicle prioritization and queue formation among vehicles, such as (optionally) without overt prioritization control from a remote server. For example, the vehicles of the multi-vehicle system may be communicatively coupled over a mesh network or other protocol that allows for communications among the vehicles. The mesh network may allow the vehicles to send and receive signals with one another in a dynamic and non-hierarchical manner. In one illustration, a first vehicle of the system may determine a preconditioning characteristic for a first battery of the first vehicle and may broadcast the first preconditioning characteristic across the network. A second vehicle (along with optionally many other vehicles of the multi-vehicle system) may also determine a second preconditioning characteristic and broadcast the second preconditioning characteristic across the network. The first vehicle may receive the second preconditioning characteristic from the second vehicle and compare the second preconditioning characteristic to the first preconditioning characteristic in order to determine the ranking and/or queue, as described herein. The second vehicle may similarly determine the ranking and/or queue by comparing the first preconditioning characteristic received from the first vehicle to the second preconditioning characteristic. In some cases, the first and/or second or other vehicles may communicate the determined rankings or queues with one another and resolve any discrepancies in order to establish a final ranking or queue at the charging station.

Reference will now be made to the accompanying drawings, which assist in illustrating various features of the present disclosure. The following description is presented for purposes of illustration and description. Furthermore, the description is not intended to limit the inventive aspects to the forms disclosed herein. Consequently, variations and modifications commensurate with the following teachings, and skill and knowledge of the relevant art, are within the scope of the present inventive aspects.

FIG. 1A depicts a schematic view of a multi-vehicle system 100. The multi-vehicle system 100 may be a system including one or more fleets of electric vehicles. For example, the multi-vehicle system 100 may include one or more fleets of electric vehicles from a particular coordinated operation (e.g., a fleet of delivery vehicles, shipping vehicles, taxis, buses, or other public transportation). In this respect, a "fleet" can refer to multiple vehicles that are co-owned or operated by a single entity or organization. In other cases, the electric vehicles of the multi-vehicle system 100 may be vehicles of separate fleets and/or individual vehicles that are not necessarily associated with a fleet. For example, a "fleet" can include multiple vehicles which are owned by multiple parties or entities but that work together via compatible installed software applications or that all enroll in a fleet administration service provided by a single party or entity.

In the example of FIG. 1A, a first vehicle 110, a second vehicle 130, and a third vehicle 150 are shown relative to a charging station 104. The charging station 104 may be or include any appropriate components that are adapted to facilitate the charging of a battery of an electric vehicle. For purposes of illustration, the charging station 104 is shown as a single charging station in FIG. 1A. In other cases, the charging station 104 may be one of a group of charging stations in a charging depot or other arrangement in which multiple charging stations are arranged in order to charge one or more vehicles simultaneously (e.g., charging depot 1310 of FIG. 13).

One or more (e.g., all) of the vehicles of the multi-vehicle system 100 may be electric vehicles en route to the charging station 104. Accordingly, the first vehicle 110 is shown with a first battery 114, the second vehicle 130 is shown with a second battery 134, and the third vehicle 150 is shown with a third battery 154. In the schematic representation of FIG. 1A, the first vehicle 110 may travel a first vehicle route 106*a* to the charging station 104, the second vehicle 130 may travel a second vehicle route 106*b* to the charging station 104, and the third vehicle 150 may travel a third vehicle route 106*c* to the charging station 104. Each of the vehicle routes 106*a*-106*c* may be associated with an estimated time of arrival of the respective vehicle to the charging station 104. Each of the vehicle routes 106*a*-106*c* may also be associated with projected route-based conditions that impact battery temperature and preconditioning, such as route elevation, traffic conditions, route speed, route acceleration profiles change in route elevation, vehicle weight, speed preferences, and so on.

Figure 3:
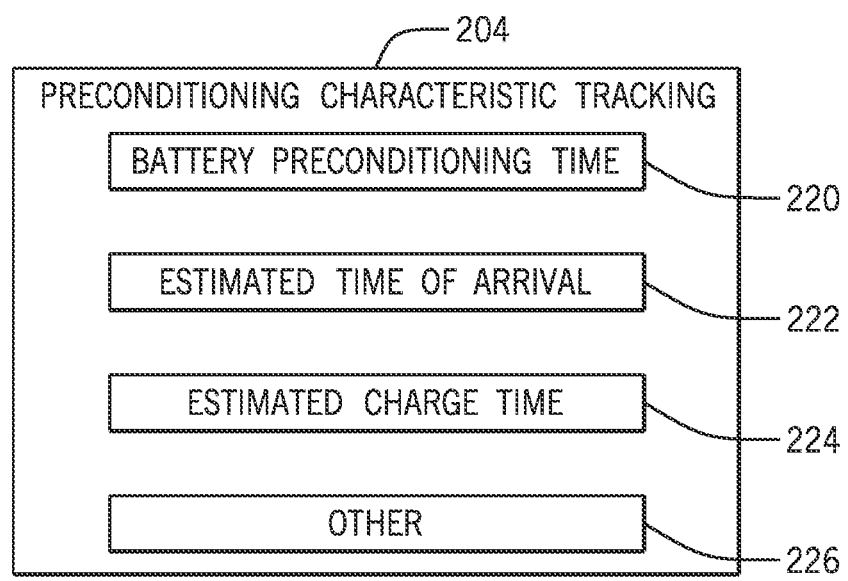
FIG. 3 depicts a functional diagram of a preconditioning characteristic tracking module of the fleet management system of FIG. 2.

Each of the vehicles 110, 130, 150 may also be associated with or have information indicative of a condition of the battery of the respective vehicle. For purposes of illustration, FIG. 1A shows the first vehicle 110 having vehicle metrics 190 that includes information indicative of a condition of the battery. It will be appreciated that rather than a visual display, the vehicle metrics 190 shown in FIG. 1A may correspond to information (e.g., numeric data) communicated across a network to various computing devices and servers, as described herein. The vehicle metrics 190 represented in FIG. 1A include a preconditioning time 192 and a charge time 194. The preconditioning time 192 may include information associated with a predicted time or required duration for the first vehicle 110 to precondition the first battery 114 to a target preconditioning temperature. The charge time 194 may include information associated with a predicted time or required duration for the first battery 114 to be fully or partially recharged at the charging station 104 (e.g., the time required to bring the battery charge to a predetermined value, whether that value is a full charge (i.e., 100% SOC) or a partial charge (e.g., 80% SOC)). In other cases, the vehicle metrics 190 may include additional information, such as battery temperature, route information, vehicle performance data, and so on. The second vehicle 130 and the third vehicle 150 may also include information substantially analogous to the vehicle metrics 190 shown in relation to the first vehicle 110; redundant explanation of which is omitted herein for clarity. The information of the vehicle metrics 190 and/or the time and other factors associated with the route 106a may be used to determine the preconditioning characteristic(s) of one or more vehicles of the multi-vehicle system (FIG. 3 herein).

The vehicles 110, 130, 150 and the charging station 104 may be communicatively coupled with one another. In the schematic representation of FIG. 1A, the first vehicle 110 is shown associated with a first signal 111, the second vehicle 130 is shown associated with a second signal 131, the third vehicle 150 is shown associated with a third signal 151, and the charging station 104 is shown associated with a charging station signal 105. As described herein, the signals 111, 131, 151, 105 may be representative of information exchanged among the vehicles 110, 130, 150 and the charging station 104, and/or substantially any other components of the multi-vehicle system, including network components, in order to facilitate the management, coordination and prioritization of the vehicles relative to the charging station 104, as further described in connection with FIG. 1B.

Figure 1B:
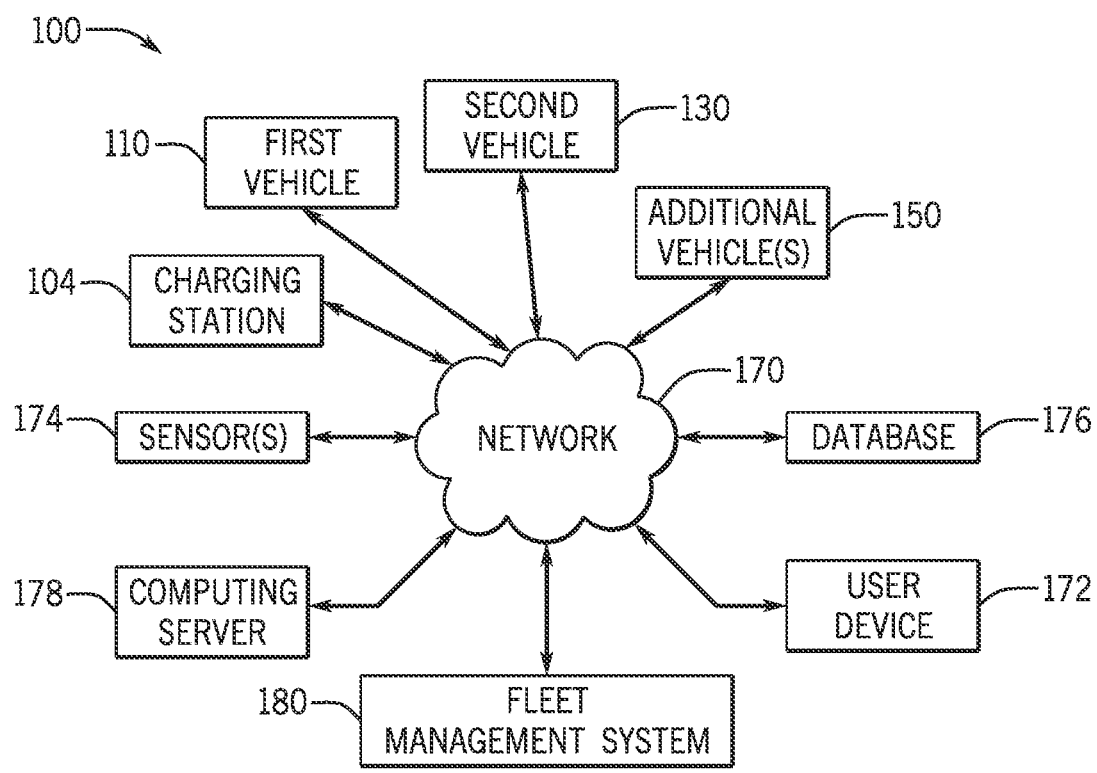
FIG. 1B depicts block diagram of a distributed network for use with the system of FIG. 1A.

A network block diagram of the multi-vehicle system 100 is shown in FIG. 1B. The first vehicle 110, the second vehicle 130, the third vehicle 150, and charging station 104 may be configured to transmit signals 111, 131, 151, 105, respectively, over a communicatively coupled network 170. For example, the first vehicle 110, the second vehicle 130, the third vehicle 150, and charging station 104 may include a communications component, such as one or more integrated antennas. The network 170 may, for example, be a wireless or cellular network that facilitates the transmission of data among various components of the system 100. The network 170 may include two or more communication methods (e.g., cellular, BLUETOOTH® and/or Wi-Fi) to communicatively couple the system 100 elements. The network 170 may include wireless and wired transmission methods, such as, but not limited to, cellular, Wi-Fi, radio transmissions, Ethernet, local area networks (LANs), ZIGBEE®, wide area networks (WANs), and so on.

The network 170 may be communicatively coupled to a variety of different components, devices, and systems to facilitate the analysis, processing, and communication of information associated preconditioning characteristics and, more generally, prioritization and ranking of the vehicles of the multi-vehicle system 100 at the charging station 104. For example, the system 100 may include one or more user devices 172 that interact with the system 100 via the network 170. The system 100 may communicatively couple to multiple user devices 172, allowing individual users to interact separately with the system 100 via separate user devices 172. In some cases, the device 172 may be associated with an operator of a particular vehicle. In other cases, the devices 172 may operate by a third party, such as a fleet manager or other party associated with the operation of the charging station 104. The user device 172 may therefore be substantially any type of computing device that may transmit and receive data from other computing devices. For example, the user device 117 may be a smartphone, tablet computer, wearable device, laptop, vehicle dashboard-integrated computing system, and so on. The user device 172 may include a display or screen that allows a user to receive information, including visual representations of the preconditioning characteristics of other vehicles, rankings or queues of vehicles at a given charging station. The user device 172 may be in electronic communication with one or more other devices of the system 100, including the charging station 104, either directly, or via the network 170.

The system 100 may also include one or more optional sensors 174. For example, the sensor(s) 174 may be a temperature sensor or other device that is used for the detection of ambient conditions associated with the multi-vehicle system 100. The sensors(s) 174 may also include sensors associated with detecting traffic information for the vehicles of the system or otherwise associated sending and receiving signals among the vehicles and/or with a charging station 104 or other device or system. The sensor(s) 174 may more generally be any other sensor that provides supplemental information to the network 170 associated with battery preconditioning, vehicles, vehicle environment, and so on.

The system may also include computing server 178. The computing server 178 may be configured to receive information from the vehicles 110, 130, 150, the charging station 104, the user device 172, and/or the sensor(s) 174. In some embodiments, the computing server 178 may include one or more computing devices (e.g., servers, computers, etc.), that may be a single device or multiple devices operating in a distributed environment. The computing server may 178 may be physically remote from the vehicles 110, 130, 150 and/or the charging station 104. The computing server 178 may be configured to execute one or more fleet management systems (e.g., fleet management system 180 or fleet management system 200 of FIG. 2) in order to manage the vehicles 110, 130, 150 and prioritize the vehicles based, in part, on preconditioning characteristics of the vehicles. The system 100 may also include one or more databases 176 that may store information related to or used by components of the system 100. For example, the databases 176 may include databases that store information associated with the vehicles 110, 130, 150, the charging station 104, the vehicle environment, and so on, which may be used to produce information in conjunction with the data collected by particular vehicles (e.g., preconditioning characteristics, and the like). The type, structure, and data stored within the various databases 176 may be varied depending on the types of detected characteristics of the vehicles 110, 130, 150 and associated preconditioning characteristics determined, and desired informational output.

The system 100 may optionally include one or more fleet management systems 180. The fleet management system 180 may include a non-transitory computer-readable media encoded with instructions that may be executed by various computing device of the system 100. The fleet management system 180 may therefore be operable to cause data to be transmitted and received between other computing devices and elements of the system 100.

The fleet management system 180 may generally operate to facilitate the coordination of the vehicles 110, 130, 150, and/or other vehicles of the multi vehicle system 100. For example, the fleet management system 180 may operate to determine a prioritization or ranking of the vehicles 110, 130, 150 relative to the charging station 104. For example, the fleet management system 180 may receive information from one or more of the vehicles 110, 130, 150 related to a preconditioning characteristic, as defined herein, and rank the vehicles 110, 130, 150 for charging priority at the charging station 104 based, in part, on the preconditioning characteristic. The fleet management system 180 may further operate to determine a queue of the vehicles 110, 130, 150 at the charging station 104. For example, the fleet management system 180 may apply a set of hardcoded rules and/or manual user inputs to vary the priority ranking of the vehicles at the charging station 104. The fleet management system 180 may be further configured to analyze the present and future anticipated usage of the charging station 104 and update the queue accordingly. The fleet management system 180 may further facilitate one or more preconditioning operations in the respective vehicles 110, 130, 150. As one example, the fleet management system 180 may issue one or more commands to respective vehicles to initiate a preconditioning operation, based on the priority ranking and/or queue position of the respective vehicle relative to the charging station 104. The fleet management system 180 is shown in the example block diagram of FIG. 1B as a separate element than the vehicles 110, 130, 150. In other examples, such as those described below in relation to FIGS. 9A-12, the fleet management system 180 may operate at least partially via a computing device of one or more vehicles of the system.

Figure 2:
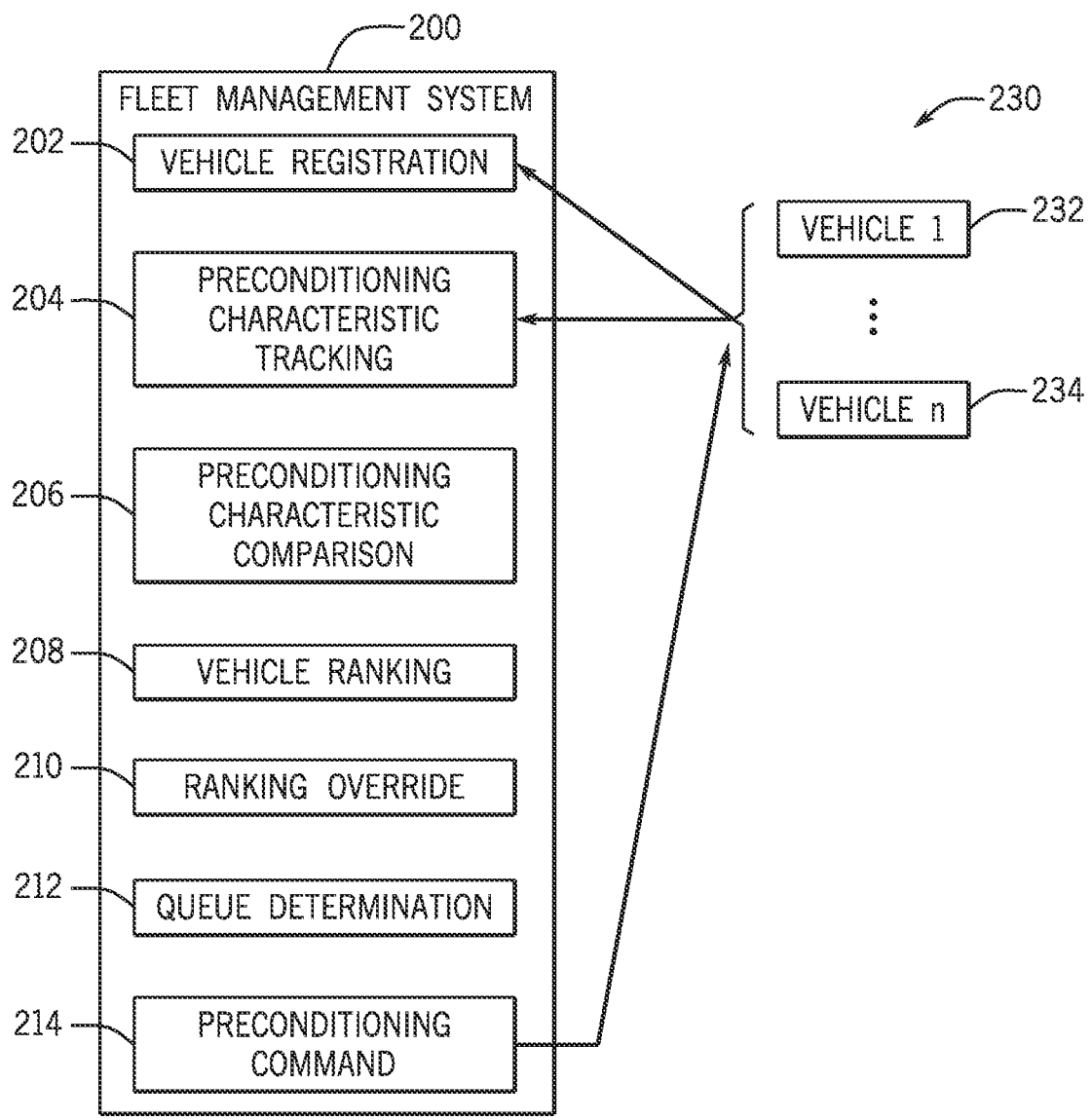
FIG. 2 depicts a functional diagram of a fleet management system and a group of vehicles.

With reference to FIG. 2, a functional diagram of a fleet management system 200 is shown. The fleet management system 200 is presented as an example implementation of the fleet management system 180 described above. Various functional modules and operations of the fleet management system 200 are presented in detail below. It will be appreciated that more or fewer modules and operations may be used for a given implementation.

FIG. 2 shows the fleet management system 200 including a vehicle registration module 202. The vehicle registration module may be configured to obtain registration information for one or more vehicles of a multi-vehicle system, such as any of the multi-vehicle systems described herein. As shown in FIG. 2, a multi-vehicle system 230 may include a first vehicle 232 and a subsequent vehicle 234 (e.g., up to any whole number "n" of vehicles). The first vehicle 232 and the subsequent vehicle 234 may be vehicles of a fleet of vehicles. The first vehicle 232 and the subsequent vehicle 234 may be vehicles en route to a charging station (e.g., charging station 104). The fleet management system 200 is configured to determine a priority ranking and/or queue of the vehicles of the multi-vehicle system 230 relative to the charging station. In this regard, the vehicle registration module 202 may receive information from the first vehicle 232, the subsequent vehicle 234, and/or other vehicles of the system 230. The received information may be indicative of an intention of the first vehicle 232, subsequent vehicle 234, and so on to charge at a particular charging station. The vehicle registration module 202 may receive information from the vehicles 232, 234 automatically, such as when the vehicles 232, 234 are within proximity to a particular charging station, reach certain milestones along a route, and so on. In other cases, the vehicle registration module 202 may receive information from the vehicles 232, 234 in response to an input from a user of the vehicle, a remote operator, and/or other prompt that causes the respective vehicle to be registered for potential charging at the identified charging station.

In some cases, the vehicle registration module 202 may receive information from the vehicles 232, 234 indicative of an intention to charge at a particular charging station and other information associated with the vehicles 232, 234 may be known by the fleet management system 200. Other information associated with the vehicles 232, 234 may include, without limitation, certain identifying information of the vehicle (e.g., make, model, battery information, and so on), identifying information of an operator of the vehicle (e.g., name, contact information, licensing, and so on), information associated with a load of the vehicle (e.g., weight, type, criticality, and so on), and the like. In other cases, the vehicle registration module 202 may receive such information from the vehicle 232, 234 as part of a registration operation of the vehicles 232, 234 with the identified charging station. As described herein, such additional information may be used by the fleet management system in order to update a queue for the charging station.

The fleet management system 200 may further include a preconditioning characteristic tracking module 204. The preconditioning characteristic tracking module 204 may be configured to receive information from one or more of the vehicles of the multi-vehicle system 230 associated with battery preconditioning information for the vehicles. For example, and as shown with reference to FIG. 3, the preconditioning characteristic tracking module 204 may include information, such as battery preconditioning time information 220, estimated time of arrival information 222, estimated charge time information 224, and/or other information 226. The preconditioning characteristic tracking module 204 may receive these and other factors in order to determine a preconditioning characteristic for one or more vehicles of the multi-vehicle system 230. The preconditioning characteristic may be a score or metric determined for a particular vehicle that is indicative of a preconditioning status of the vehicle. More generally, the score or metric may be indicative of the amount time of time required to return the vehicle to service after charging at the identified charging station and after executing a preconditioning operation that allows the vehicle to charge at the charging station.

The preconditioning characteristic tracking module 204 may be configured to determine the preconditioning characteristic based on a variety of algorithms, which may be updated at the fleet and/or vehicle level from time to time. In one example, the preconditioning characteristic tracking module 204 may determine the preconditioning characteristic for a given vehicle by summing a value of the estimated charge time information with the higher of: (i) a value of the battery preconditioning time information 220; and (ii) a value of the estimated time of arrival information 222. Adding the estimated charge time or time to charge the battery may enhance the accuracy of determining a minimum amount of time for a vehicle to return to service. The value of the estimate time of arrival information 222 may be measured with respect to a present position of the vehicle relative to the identified charging station along a route. The value of the battery preconditioning time information 220 and the value of the estimated time of arrival information 222 may be based on the present and anticipated future state of the battery of the vehicle. Accordingly, with use of this sample algorithm, a relatively lower preconditioning characteristic may be indicative of a lower amount of time for the vehicle to return to service post-charging and post-preconditioning, whereas a relatively higher preconditioning characteristic may be indicative of a higher amount of time for the vehicle to return to service post-charging and post-preconditioning. In other cases, other algorithms may be used, and the preconditioning characteristic may be indicative of other relationships between the vehicle and the charging station, based on information associated with preconditioning the battery of the vehicle. In this regard, the initial ordering (e.g., based on the preconditioning characteristic) may be based on any synthesized calculation of multiple variables (e.g., calculated by a vehicle and transmitted to the management system and/or among the vehicles), a singular statistic (e.g., vehicles with the greatest loads go first), or multiple independent variable unsynthesized calculations (e.g., sent to the management system, and the management system applies a set of weights/algorithms to determine which factors to prioritize). In this regard, the ordering of the vehicles can be done by either the vehicle or the management system, as described herein.

The fleet management system 200 may further include a preconditioning characteristic comparison module 206. The preconditioning characteristic comparison module 206 may operate to compare preconditioning characteristics from multiple vehicles across the multi-vehicle system 230. For example, the preconditioning characteristic comparison module 206 may compare a first preconditioning characteristic from the first vehicle 232 and a second preconditioning characteristic from the subsequent vehicle 234. In some cases, the preconditioning characteristic comparison module 206 may be operated to apply a weighting function and/or other metric to the various preconditioning characteristics from the vehicles across the multi-vehicle system 230. This may allow the preconditioning characteristic comparison module 206 to compare values of the preconditioning characteristic that are comparable data points or representative of comparable circumstances across the vehicles or otherwise statistically comparable pieces of information. As one example, the preconditioning characteristic comparison module 206 may account for differences in vehicle type, battery type, preconditioning equipment of the vehicle, and so on such that comparison of the first and second preconditioning condition is a comparison of like data that may be representative or otherwise adjust for present conditions. In this regard, the preconditioning characteristic comparison module 206 may also be configured to access multiple data points from the vehicle in order to facilitate the foregoing comparison. As such, each vehicle may calculate a return to service metric or time and/or send raw data (e.g., time to charger, charging time, preconditioning time, and so on) for the preconditioning characteristic comparison module 206 to apply the weighting functions and compare the data points across a plurality of vehicles.

The fleet management system 200 may further include a vehicle ranking module 208. The vehicle ranking module 208 may be configured to determine a priority ranking of the vehicles of the multi-vehicle system 230 relative to an identified charging station. The vehicle ranking module 208 may rank the vehicles based on an output from the preconditioning characteristic comparison module 206. For example, the vehicle ranking module 208 may order the vehicles of the multi-vehicle system 230 in a descending or ascending order based on the preconditioning characteristic value. In a case where the preconditioning characteristic is representative of a minimum amount of time required to recharge the battery of a given vehicle, the vehicle ranking module 208 may sort the vehicles such that a highest priority is assigned to the vehicle having the lowest value of a preconditioning characteristic. In this regard, the vehicle which can return to service the quickest post-charging and post-preconditioning may be prioritized at the charging station. Subsequent vehicles may thus be assigned a lower priority as a result of having a higher value of the preconditioning characteristic, which is indicative of the subsequent vehicle requiring a longer amount of time to return to service post-charging and post-preconditioning.

The fleet management system 200 may further optionally include a ranking override module 210. The ranking override module 210 may allow the fleet management system 200 to apply a set of hardcoded rules and/or user input to change a priority of the vehicles relative to the charging station. For example, the vehicle ranking module 208 may output a prioritized ranking of the vehicles based on preconditioning factors, and the ranking override module 210 may update or modify the prioritized ranking based on additional factors. As one example, the ranking override module 210 may include a set of rules that increase the priority of certain vehicle types at the charging station (e.g., an emergency vehicle has a higher priority than a commercial or private-user vehicle). As another example, the ranking override module 210 may include a set of rules that increase the priority of certain vehicles based on any of a range of other criteria, including route type, load type, delivery criticality type, payment status (e.g., prioritizing higher-paying charging customers or deprioritizing charging customers with poor payment history), and so on. Additionally or alternatively, the ranking override module 210 may be operable to receive an override priority or override input that increases or decreases a priority of a vehicle at the charging station, notwithstanding preconditioning characteristics. For example, the fleet management system 200 may be operable to receive an input from a fleet manager that prioritizes a certain vehicle over another at the charging station for business-related reasons or other reasons.

The fleet management system 200 may further include a queue determination module 212. The queue determination module 212 may operate to set a queue for the identified charging station. For example, the queue determination module 212 may determine an order of the first vehicle 232, the subsequent vehicle 234 and/or any other vehicles for charging at the identified charging station. The queue determination module 212 may determine an order of the vehicles based on an output from the vehicle ranking module 208. For example, the queue determination module 212 may set a queue for the charging station based on the preconditioning ranking. The queue determination module 212 may further determine an order of the vehicles based on an output from the ranking override module 210. For example, the queue determination module 212 may set the queue for the charging station as modified by the override priority determined by the set of hardcoded rules and/or user inputs. The queue determination module 212 may also operate to determine a queue for multiple charging stations of a charging depot or other common location having multiple charging stations, as described in greater detail below with respect to FIG. 13. The queue determination module 212, in cooperation with communication components of the system described herein, may communicate the queue to the vehicles of the multi-vehicle system 230, the charging station, and/or other elements of the system as appropriate for a given application.

The fleet management system 200 may further include a preconditioning command module 214. The preconditioning command module 214 may be configured to issue one or more commands to the vehicles of the multi-vehicle system 230 regarding a preconditioning start time. For example, the preconditioning command module 214 may be operable to cause a transmission of information to the vehicles of the multi-vehicle system 230 regarding a target preconditioning start time. The target preconditioning start time may be a time at which the vehicle may begin a preconditioning operation such that the battery of the vehicle will have a temperature at or substantially near a target preconditioning temperature at or around the time at which the charging station is available for the charging the vehicle. The target preconditioning start time may be tailored based on the queue determined by the queue determination module 212. In one example, a vehicle may be en route to an open charging station, and the target preconditioning time may be a time such that the battery temperature reaches the target preconditioning temperature upon the arrival of the vehicle at the charging station. As another example, a vehicle may be en route to an occupied charging station, and the target preconditioning time may be a time such that the battery temperature reaches the target preconditioning temperature upon the anticipated time at which the charging station become available for charging by the vehicle.

Figure 4:
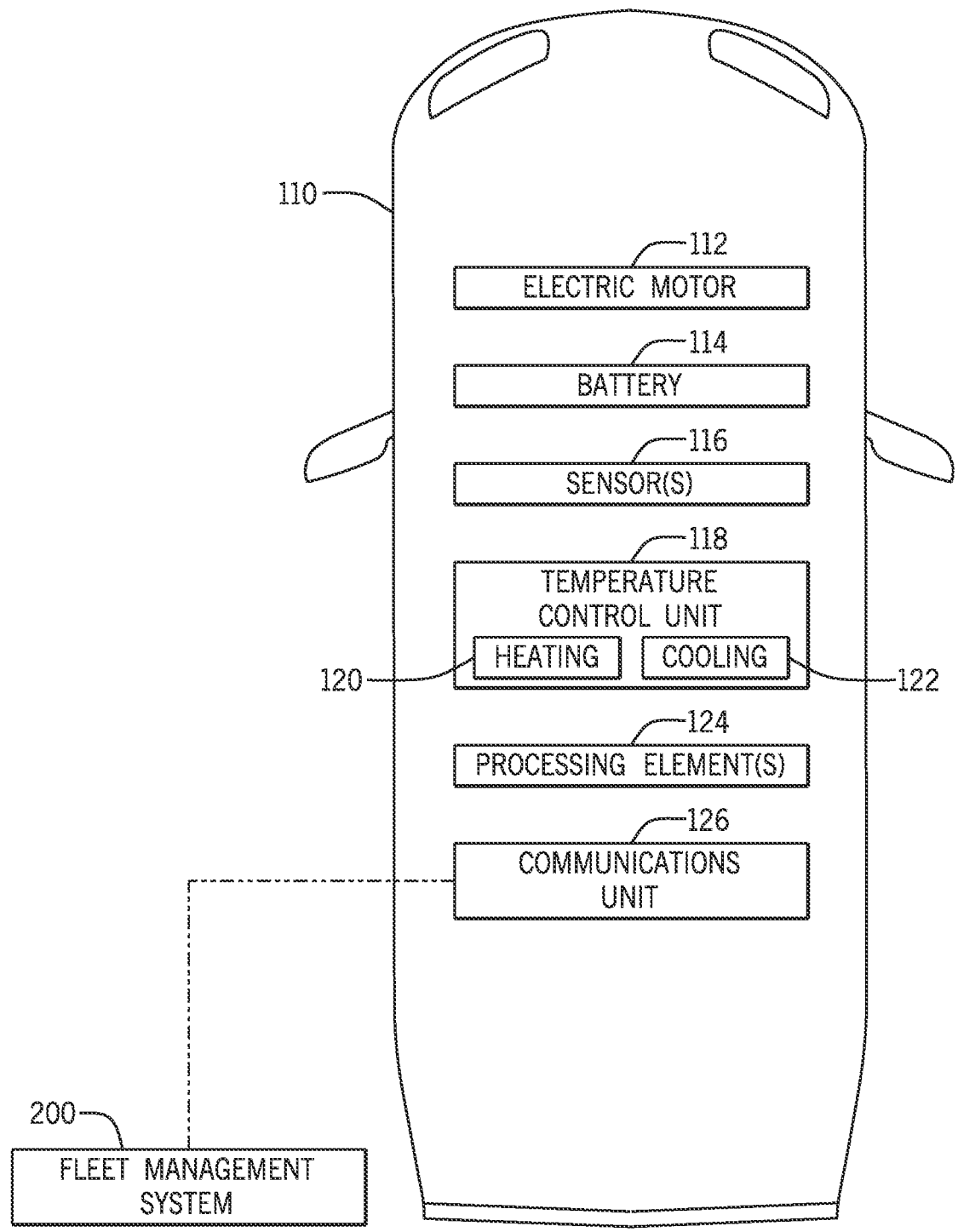
FIG. 4 depicts a functional diagram of a vehicle including an electric motor, a battery, and other components.

In one example, the fleet management system 200 may operate remote from one or more vehicles of a multi-vehicle system. For purposes of illustration, FIG. 4 shows elements of the vehicle 110 described generally above with reference to FIG. 1 and the fleet management system 200 operating remote from the vehicle 110. With reference to FIG. 4, the vehicle 110 is shown schematically. The vehicle 110 includes the battery 114, described above, which may be electrically connected to an electric motor 112. The electric motor 112 and the battery 114 may operate, among other functions, to provide propulsion to the vehicle 110 such that the vehicle 110 is capable of traversing a path to the charging station 104. Without limitation, the electric motor 112 and the battery 114 may be components of a plug-in electric vehicle or a hybrid electric vehicle, including vehicles which use, in addition to the components shown in FIGS. 1A and 1B, an internal combustion engine. The vehicle 110 is further shown including sensor(s) 116. The sensor(s) 116 may include a variety of instruments that operate to determine one or more conditions of the electric motor 112, battery 114, and/or or various other component of the vehicle 110. For example, the sensor(s) 116 may include various temperature sensors, including thermocouples, thermistors, and resistance-based temperature detectors, among other instruments. In the present example, the temperature sensor may be configured to detect a temperature of the battery 114. In this regard, the temperature sensor may be used to determine a difference between the temperature of the battery 114 and one or more target temperatures, such as a target preconditioning temperature (e.g., temperatures 614, 634 of FIG. 6).

FIG. 4 further illustrates, schematically, a temperature control unit 118. The temperature control unit 118 may broadly be configured to alter a temperature of the battery 114. In this regard, the temperature control unit 118 may include a heating module 120 and a cooling module 122. The heating module 120 may include various components configured to increase a temperature of the battery 114, including but not limited to, certain resistive heating elements, heat traces, wicks, coolant lines, radiators, and so on. The cooling module 122 may include various components configured to decrease a temperature of the battery 114, including but not limited to certain fans, chillers, heat sinks, wicks, coolant lines, radiators, and so on. In certain cases, the temperature control unit 118 may operate in response to an input or measurement from the sensor(s) 116. For example, the sensor(s) 116 may detect a battery temperature and the temperature control unit 118 may initiate an operation to increase or decrease a temperature of the battery 114 as needed for a given application.

The foregoing operations of the vehicle 110 may be facilitated by processing element(s) 124 and communications unit 126. The processing elements(s) 124 may include one or more computer processors or microcontrollers that are configured to perform operations in response to computer-readable instructions. The processing elements(s) 124 may be a central processing unit of the vehicle 110. Additionally or alternatively, the processing elements(s) 124 may be other processors within the device including application specific integrated chips (ASIC) and other microcontroller devices. For example, the processing element(s) 124 may be elements of the computer system 1400 described herein in relation to FIG. 14.

The vehicle 110 may also include a communications unit 126 that is configured to transmit and/or receive signals or electrical communications from an external or separate device. For example, the communications unit 126 may be, or be coupled with, a BLUETOOTH® chip or similar device that operates to send and receive signals, including an ultra-low power BLUETOOTH® Low Energy (BLE) module. In other cases, other BLUETOOTH® modules may be used. Additionally or alternatively, the communications unit 126 may employ other or additional techniques to facilitate sending and receiving signals such as, but not limited to, radio transmissions, Ethernet, Wi-Fi, local area network (LAN), ZIGBEE®, wide area network (WAN), and so on.

As shown in FIG. 4, the vehicle 110 may be communicatively coupled with the fleet management system 200 via the communications unit 126. For example, the vehicle 110 may be operable to send information to the fleet management system 200 regarding one or more preconditioning characteristics, characteristics of the battery, and/or other information associated with the vehicle. Further, the vehicle 110 may be operable to receive information from the fleet management system 200 regarding a preconditioning ranking, queue, preconditioning command, and/or other output of the fleet management system 200, as described above in relation to FIG. 2.

Figure 5A:
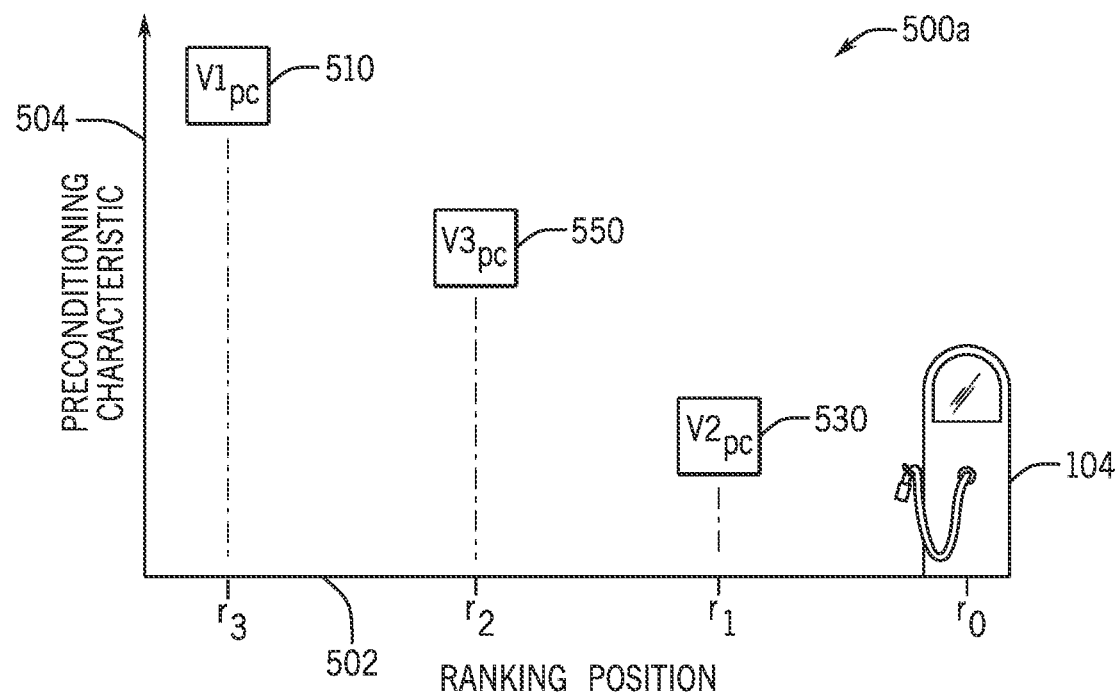
FIG. 5A depicts a chart representing a preconditioning ranking for the vehicle of FIG. 1A.
Figure 5B:
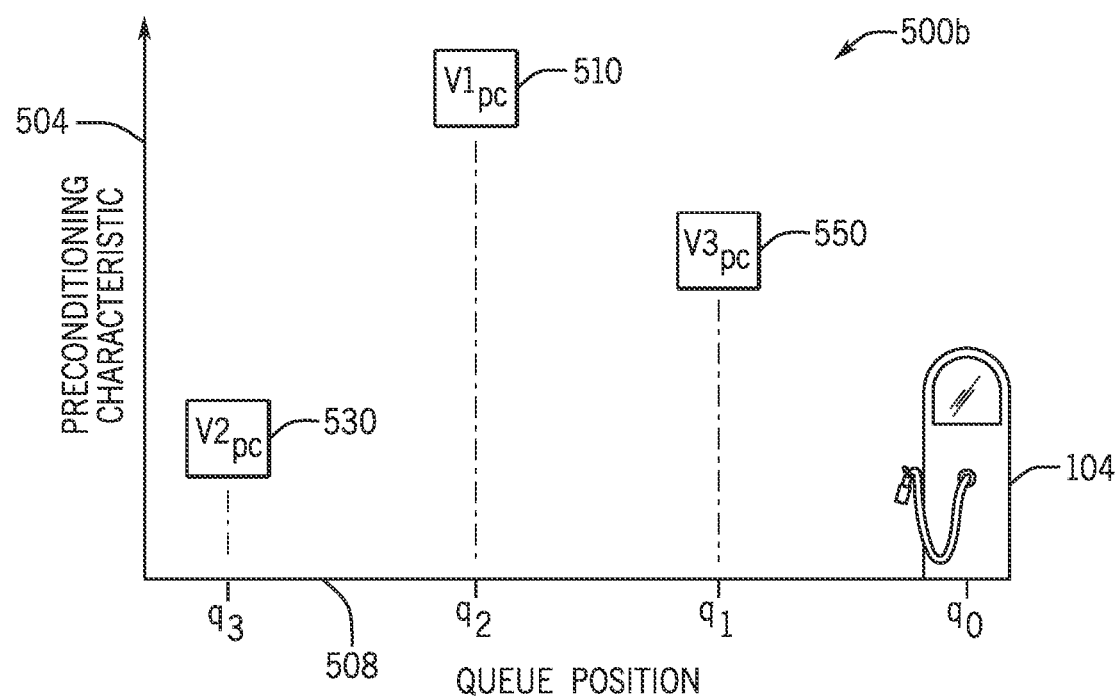
FIG. 5B depicts a chart representing a queue for the charging station of FIG. 1A.

FIGS. 5A and 5B depict graphical representations of the priority ranking and queue generation performed by the fleet management system 200. For example, FIG. 5A generally depicts graphically an output of the vehicle ranking module 208 described above in relation to FIG. 2. Further, FIG. 5B generally depicts graphically an output of the queue determination module 212 described above in relation to FIG. 2.

With reference to FIG. 5A, a chart 500a is shown representing a preconditioning ranking for the vehicles 110, 130, 150 of FIG. 1A. The chart 500a is shown as including a ranking position axis 502 and a preconditioning characteristic axis 504. The ranking position axis 502 may be indicative of a priority ranking for usage of the charging station 104 shown in FIG. 1A. A value of $r_0$ on the axis 502 may represent the charging station 104, a value of $r_1$ on the axis 502 may represent a first or highest priority ranking for a vehicle to use the charging station 104, a value of $r_2$ on the axis 502 may represent a second or next highest priority ranking, and a value of $r_3$ on the axis 502 may represent a third or next highest priority ranking, and so on. The preconditioning characteristic axis 504 may be indicative of a value of the preconditioning characteristic for a given vehicle of the multiple vehicle system, as determined by the techniques described herein.

The chart 500a plots a value of a first vehicle preconditioning characteristic 510, a second vehicle preconditioning characteristic 530, and a third vehicle preconditioning characteristic 550. The first vehicle preconditioning characteristic 510 may correspond to a preconditioning characteristic of the first vehicle 110, the second vehicle preconditioning characteristic 530 may corresponding a preconditioning characteristic of the second vehicle 130, and the third vehicle preconditioning characteristic 550 may correspond to a preconditioning characteristic of the third vehicle 150. As described herein, in one example, the preconditioning characteristic may generally be indicative of a minimum amount of time required to recharge a battery of the vehicle at the identified charging station after a preconditioning operation. In this regard, the vehicle ranking module 208 and/or other element of the fleet management system 200 may operate to rank the vehicles such that the vehicle having the lowest value of a preconditioning characteristic has the highest priority for use of the charging station.

The second vehicle preconditioning characteristic 530 has a lower value than the first vehicle preconditioning characteristic 510 and the third vehicle preconditioning characteristic 550. Accordingly, the chart 500a shows the second vehicle preconditioning characteristic 530 (representative of the second vehicle 130) at the value of $r_1$ on the axis 502 representing a first or highest priority ranking for a vehicle to use the charging station 104. The third vehicle preconditioning characteristic 550 has the next lowest value. Accordingly, the chart 500a shows the third vehicle preconditioning characteristic 550 (representative of the third vehicle 150) at the value of $r_2$ on the axis 502 representing a second or next highest priority ranking to use the charging station 104. The first vehicle preconditioning characteristic 510 has the next lowest value. Accordingly, the chart 500a shows the first vehicle preconditioning characteristic (representative of the first vehicle 110) at the value of $r_3$ on the axis 502 representing a third or next highest priority ranking. Additional vehicles could be added if they are part of the system 100 or detected or registered by the fleet management system 200.

Based on the ranking shown in the chart 500a, the vehicles of the system 100 may use the charging station 104 in the following order: the second vehicle 130, the third vehicle 150, and the first vehicle 110. The fleet management system 200 may update the ranking shown in the chart 500a from time to time. For example, the fleet management system 200 may send and receive information with the vehicles 110, 130, 150 in order to update the value of the preconditioning characteristic shown in the chart 500a. The preconditioning characteristic may be updated based on information such changes in traffic, battery conditions, operator preferences and decisions and so on. Therefore, rather than a static determination, the chart 500a may be representative of a ranking of the vehicles at a single point in time, which may be updated (e.g., reorder the vehicles) to maximize the efficient usage of the charging station 104.

With reference to FIG. 5B, a chart 500b is shown representing a sample queue for the vehicles 110, 130, 150 of FIG. 1A. The chart 500b is shown as including a queue position axis 508 and a preconditioning characteristic axis 504. The queue position axis 508 may be indicative of a position of a vehicle in a queue for usage of the charging station 104 shown in FIG. 1A. A value of $q_0$ on the axis 508 may represent the charging station 104, a value of $q_1$ on the axis 508 may represent a first or highest position in a queue for a vehicle to use the charging station 104, a value of $q_2$ on the axis 508 may represent a second or next position in the queue, and a value of $q_3$ on the axis 508 may represent a third or next highest priority ranking, and so on. The preconditioning characteristic axis 504 of FIG. 5B may be substantially analogous to the preconditioning axis 504 described above in relation to FIG. 5A, with the value of the first vehicle preconditioning characteristic 510, the second vehicle preconditioning characteristic 530, and the third vehicle preconditioning characteristic 550 plot relative to the axis 504.

The fleet management system 200 may be configured to update the priority ranking (e.g., the ranking shown in FIG. 5A) based on a variety of conditions and factors. As one example, the fleet management system 200 may update the priority ranking based on an override priority. For example, the priority ranking may be updated based on a set of hardcoded rules, user inputs, and/or otherwise updated such that the order of the vehicles in the queue is updated based on additional factors than those considered during the priority ranking, including factors that are not related to battery preconditioning.

In the example of FIG. 5B, the fleet management system 200 may operate to apply an override priority in order to update the queue from the priority ranking shown in FIG. 5A. To illustrate, the override priority may be associated with a set of rules that change the priority of the third vehicle 150 in the queue. The set of rules may change the priority of the third vehicle 150 in the queue notwithstanding the value of the third preconditioning characteristic 550. For example, the third vehicle 150 may be a vehicle associated with the delivery of critical goods. The override priority may thus increase the position of the third vehicle 150 in the queue so that the third vehicle 150 may charge at the charging station 104 prior to the other vehicles. Accordingly, the chart 500b shows the third preconditioning characteristic 550 (representative of the third vehicle 150) at the value of $q_1$ on the axis 508, which may represent a first or highest position in a queue for a vehicle to use the charging station 104. As another example, the override priority may be associated with a set of rules that change the priority of the first vehicle 110 in the queue notwithstanding the value of the first preconditioning characteristic 510. For example, the first vehicle 110 may be a vehicle identified by a fleet manager as requiring urgent recharging. The override priority may thus increase the position of the first vehicle 110 in the queue so that the first vehicle 110 may charge at the charging station 104 sooner that the first vehicle 110 otherwise would, based on the first preconditioning characteristic 510. Accordingly, the chart 500b shows the third precondition characteristic 550 (representative of the third vehicle 150) at the value of $q_2$ on the axis 508, which may represent a second or next position in the queue. In this regard, the override priority increases the priority of the first vehicle in the queue by one position, but does not necessarily operate to increase the priority of the first vehicle to the top position, i.e., the third vehicle remains in the top position, notwithstanding the override priority applied to the first vehicle. Further, the override priority may not necessarily apply to the second vehicle 130, and thus the chart 500b shows the second precondition characteristic 530 (representative of the second vehicle 130) at the value $q_3$ on the axis 508 may represent a third or next highest priority ranking.

Based on the queue shown in the chart 500b, the vehicles of the system 100 may use the charging station 104 in the following order: the third vehicle 150, the first vehicle 110, and the second vehicle 130. The fleet management system 200 may update the queue shown in the chart 500*b* from time to time. For example, the fleet management system 200 may send and receive information with the vehicles 110, 130, 150 in order to reassess the position in the queue. For example, an override priority for a particular vehicle may change over time, such as where a fleet manager decides a vehicle no longer requires urgent recharging. The priority may also change based on a distance of the vehicle from the charging station. As one example, while the third vehicle of FIG. 5B may have the highest priority in the queue, the third vehicle may be at a substantial distance from the charging station as compared with other, lower-priority vehicles. In this regard, the systems and techniques described herein may allow lower-priority vehicles the ability to charge (including partial charges) at the charging station, in anticipation of the higher-priority vehicle taking longer to arrive at the charging station than other vehicles. Therefore, rather than a static determination, the chart 500*b* may be representative of a queue of the vehicles at a single point in time, which may be updated in light of substantially real time conditions of the multi-vehicle system. Thus, vehicles can be promoted or demoted in the queue from time to time based on changing vehicle, fleet, and/or charging station conditions.

The fleet management system 200 may also be configured to coordinate battery preconditioning across a fleet of vehicles based on the availability of the charging station. For example, the fleet management system 200 may be configured to issue one or more commands to vehicles of the fleet to begin a battery preconditioning operation at a time such that the battery will reach a target preconditioning temperature upon arrival at the charging station. In some cases, the vehicle will begin preconditioning en route to the charging station, whereas in other cases the vehicle will precondition while at the charging station, based on an availability of the charging station and a time until that particular vehicle will be able to begin charging. In other cases, the vehicle may precondition both while en route to the charging station and can continue preconditioning at the charging station.

Figure 6:
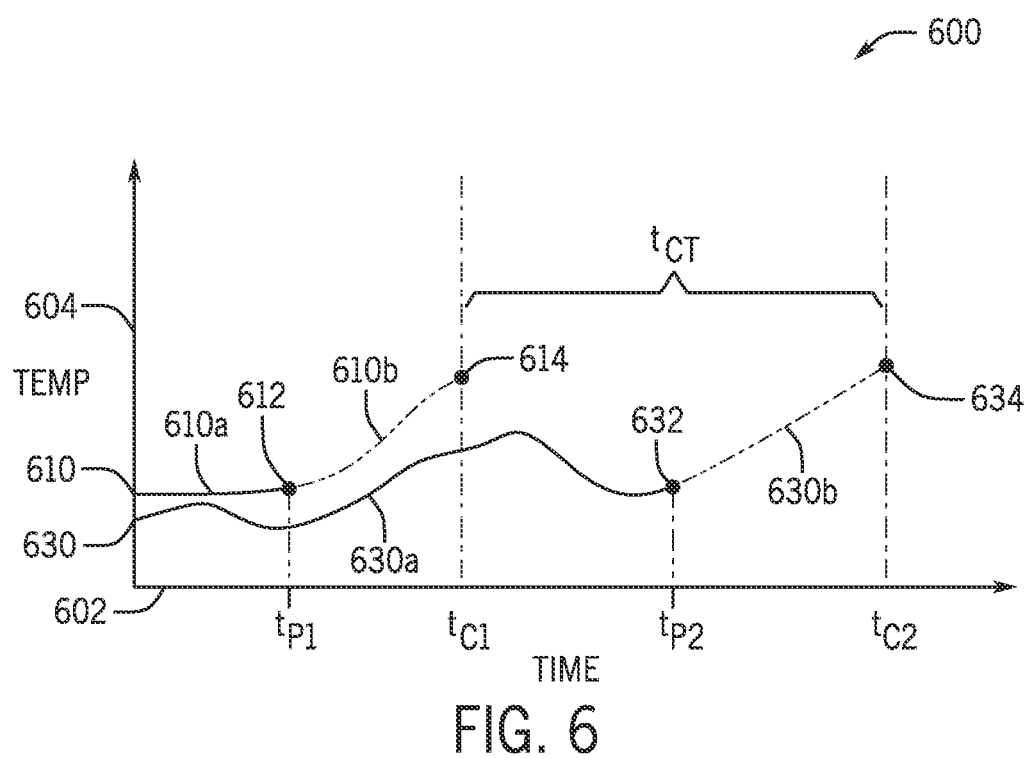
FIG. 6 depicts a chart representing a preconditioning start time and a charging start time for vehicles of FIG. 1A.

To illustrate the foregoing, FIG. 6 shows a chart 600. The chart 600 includes a time axis 602 and a temperature axis 604. The temperature axis 604 may be indicative of battery temperature for one or more vehicles that is plotted as a function of time on the time axis 602. In FIG. 6, the chart 600 shows a temperature curve 610 of a first battery of a first vehicle during vehicle operation and during a preconditioning operation. The chart 600 further shows a temperature curve 630 of a second battery of the second vehicle during vehicle operation and during a preconditioning operation. In the example of FIG. 6, the first vehicle and the second vehicle may each be en route to charge at the same charging station. The fleet management system 200 may operate, among other functions, to coordinate the preconditioning of the second battery such that the second battery reaches a target preconditioning temperature upon the charging station becoming available for charging the second vehicle.

By way of illustration, the temperature curve 610 is shown as including a vehicle operation portion 610*a* and a preconditioning portion 610*b*. The vehicle operation portion 610*a* may represent a temperature of the battery during driving operations of the vehicle and prior to the initiation of preconditioning procedures. The precondition portion 610*b* may represent a temperature of the battery during a preconditioning operation, which may or may not occur en route to the charging station. At a time $t_{P1}$, the curve 610 may transition from the vehicle operation portion 610*a* to the precondition portion 610*b*. For example, the battery of the first vehicle may have a temperature 612 at the time $t_{P1}$ and the first vehicle may begin to modify the temperature of the battery such that the battery reaches a target preconditioning temperature 614 at a time $t_{C1}$. The first vehicle may begin to charge at the charging station at the time $t_{C1}$; a total charge time of the first vehicle may be represented by a time $t_{CT}$ on the chart 600.

The second temperature curve 630 may also have a vehicle operation portion 630*a* and a preconditioning portion 630*b*. The fleet management system 200 may operate to facilitate the preconditioning of the second battery represented by the second temperature curve 630 such that the second battery has a target preconditioning temperature when the first vehicle has completed charging. For example, the fleet management system 200 may issue one or more commands to the second vehicle such that the second vehicle initiates a preconditioning operation at a time $t_{P2}$. The second battery has a battery temperature of 632 at the time $t_{P2}$. The time $t_{P2}$ may be a time at which the second vehicle may precondition the second battery to reach a target preconditioning temperature 634 when the charging station is available for the charging the second vehicle. As illustrated in FIG. 6, the second vehicle may precondition the second battery such that the second battery has the target preconditioning temperature at a time $t_{C2}$. The time $t_{C2}$ may correspond to a time at which the first vehicle has completed charging the first battery. For example, the time $t_{C2}$ may be equal to the sum of $t_{C2}$ and $t_{CT}$. By modifying the temperature of the battery based on the availability of the charging station, the system may avoid preconditioning the battery too early, which may help conserve energy. The system may also help reduce delays by avoiding preconditioning too late, which could result in a vehicle preconditioning while a charging station remains available for otherwise charging the battery.

Figure 7:
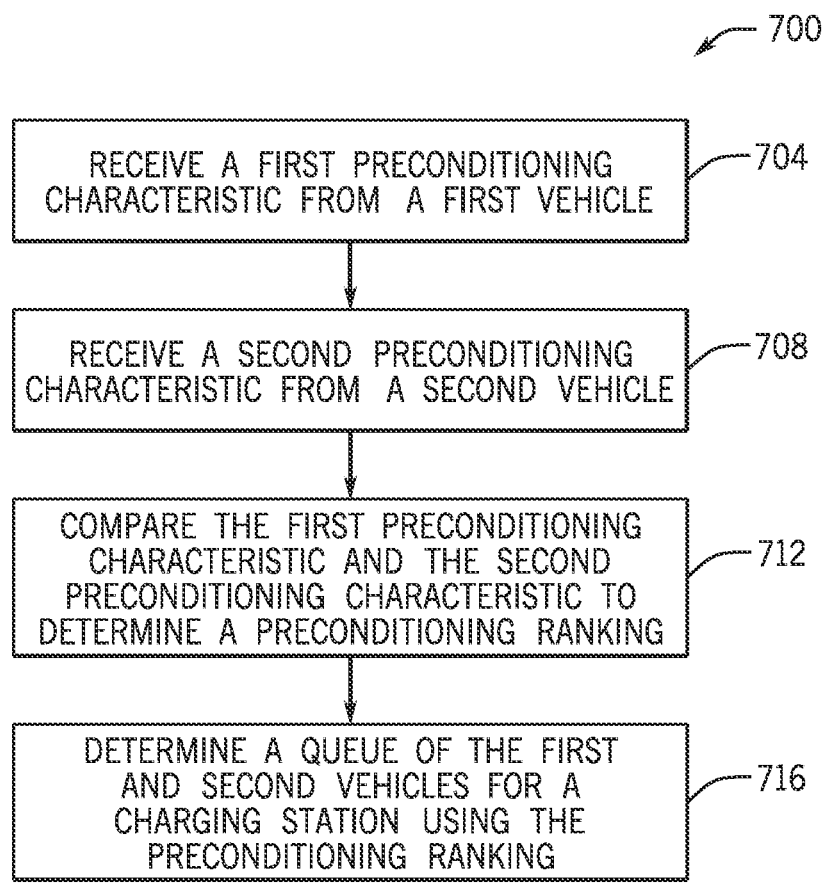
FIG. 7 depicts a flow diagram for coordinating a fleet of vehicles, according to implementations of the present disclosure.
Figure 8:
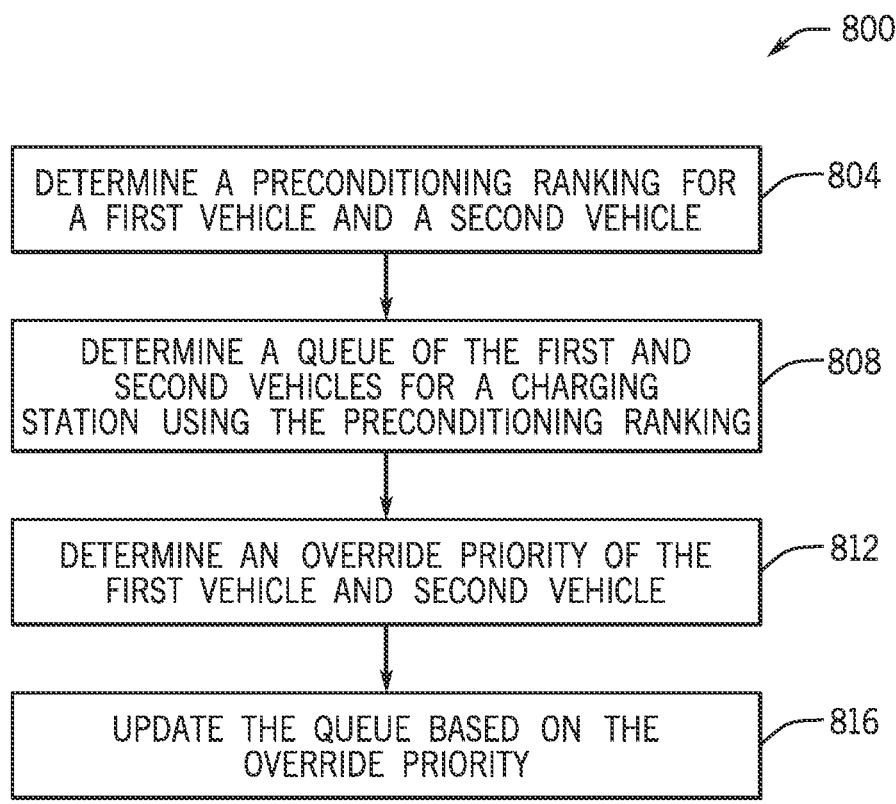
FIG. 8 depicts a flow diagram for coordinating a fleet of vehicles, according to implementations of the present disclosure.

To facilitate the reader's understanding of the various functionalities of the embodiments discussed herein, reference is now made to the flow diagram in FIGS. 7 and 8, which illustrate processes 700 and 800, respectively. While specific steps (and orders of steps) of the methods presented herein have been illustrated and will be discussed, other methods (including more, fewer, or different steps than those illustrated) consistent with the teachings presented herein are also envisioned and encompassed with the present disclosure.

With reference to FIG. 7, a method of coordinating a fleet of vehicles is disclosed. At operation 704, a first preconditioning characteristic of a first battery from a first vehicle of a fleet of vehicles is received. For example, and with reference to FIGS. 1A and 2, a first preconditioning characteristic of the first battery 114 from the first vehicle 110 is received. The first preconditioning characteristic and/or associated information may be received by the preconditioning characteristic tracking module 204 of FIG. 2. The first preconditioning characteristic may include information indicative of a minimum amount of time required to recharge the respective the first battery 114 at the charging station 104 after a preconditioning operation.

At operation 708, a second preconditioning characteristic of a second battery from a second vehicle of the fleet of vehicles is received. For example, and with reference to FIGS. 1A and 2, a second preconditioning characteristic of the second battery 134 from the second vehicle 130 is received. The second preconditioning characteristic and/or associated information may be received by the preconditioning characteristic tracking module 204 of FIG. 2. The second preconditioning characteristic may include information indicative of a minimum amount of time required to recharge the respective the second battery 134 at the charging station 104 after a preconditioning operation.

At operation 712, the first preconditioning characteristic and the second preconditioning characteristic are compared to determine a preconditioning ranking for the first vehicle and the second vehicle. For example, and with reference to FIGS. 2 and 5A, the preconditioning characteristic comparison module 206 may compare the first preconditioning characteristic and the second preconditioning characteristic of operations 704 and 708. In some cases, the preconditioning ranking may be determined by sorting the preconditioning characteristics in ascending or descending order based on the preconditioning status of the battery, as may be performed by the vehicle ranking module 208, and as illustrated in the chart 500a of FIG. 5A.

At operation 716, a queue of the first and second vehicles for a charging station is determined using the preconditioning ranking of the first and second vehicles. For example, and with reference to FIGS. 2 and 5B, the queue determination module 212 may generate a queue for the vehicles at the charging station 104. For example, the queue determination module 212 may apply a set of hardcoded rules, user inputs, and the like to modify the preconditioning ranking of operation 712. In some cases, the queue may be the same as the priority ranking. In other cases, the queue determination module 212 may identify one or more vehicles of the multi-vehicle system 100 as being applicable to the set of rules. The queue determination module 212 may then increase or decrease the priority of the identified vehicles as may be appropriate for a given application, as represented by the chart 500b of FIG. 5B.

With reference to FIG. 8, another method of coordinating a fleet of vehicles is disclosed. At operation 804, a preconditioning ranking for a first vehicle and a second vehicle is determined by comparing a first preconditioning characteristic of a first battery of the first vehicle and a second preconditioning characteristic of a second battery of the second vehicle. For example, and with reference to FIGS. 2 and 5A, the preconditioning characteristic comparison module 206 may compare the first preconditioning characteristic and the second preconditioning characteristic of operations 704 and 708. In some cases, the preconditioning ranking may be determined by sorting the preconditioning characteristics in ascending or descending order based on the preconditioning status of the battery, as may be performed by the vehicle ranking module 208, and as illustrated in the chart 500a of FIG. 5A.

At operation 808, a queue of the first and second vehicles for a charging station is determined using the preconditioning ranking of the first and second vehicles. For example, and with reference to FIGS. 2 and 5B, the queue determination module 212 may generate a queue for the vehicles at the charging station 104. In the example of operation 808, the queue determination module 808 may determine the queue is the same as the priority ranking determined with reference to FIG. 7 at operation 712. In this regard, the queue or position order for charging the vehicles at the charging station may be based on the minimum amount of time required to recharge the batteries at the charging station.

At operation 812, an override priority of the first vehicle and second vehicle is determined. For example, and with reference to FIGS. 2 and 5B, the queue determination module 212 may determine an override priority for the queue. In one example, the queue determination module 212 may determine an override priority based on an input from a user, such as a fleet manager, to increase or decrease the priority of a vehicle within the queue. In other cases, the presence or absence of certain vehicle types may trigger a set of rules that prompt a reordering of vehicles in the queue. At operation 816, the queue determination module 212 may update the queue in order to change the order of vehicles for charging at the charging station, based on the override priority.

With reference to FIGS. 9A-12, another example implementation of controlling battery preconditioning in a multi-vehicle system is disclosed. In the example of FIGS. 9A-12, the vehicles of the multi-vehicle system may operate in a mesh network and/or other network architecture that allows for coordination of the multi-vehicle system among the vehicles. For example, the system architecture of FIGS. 9A-12 may allow a computer device of a particular vehicle to determine a priority ranking and/or queue for a group of vehicles at a charging station without direct oversight from a centralized server or other fleet/network administrator. This may allow vehicles from different fleets, vehicles of different types, and so on to determine, cooperatively, a priority ranking or queue for a charging station.

Figure 9A:
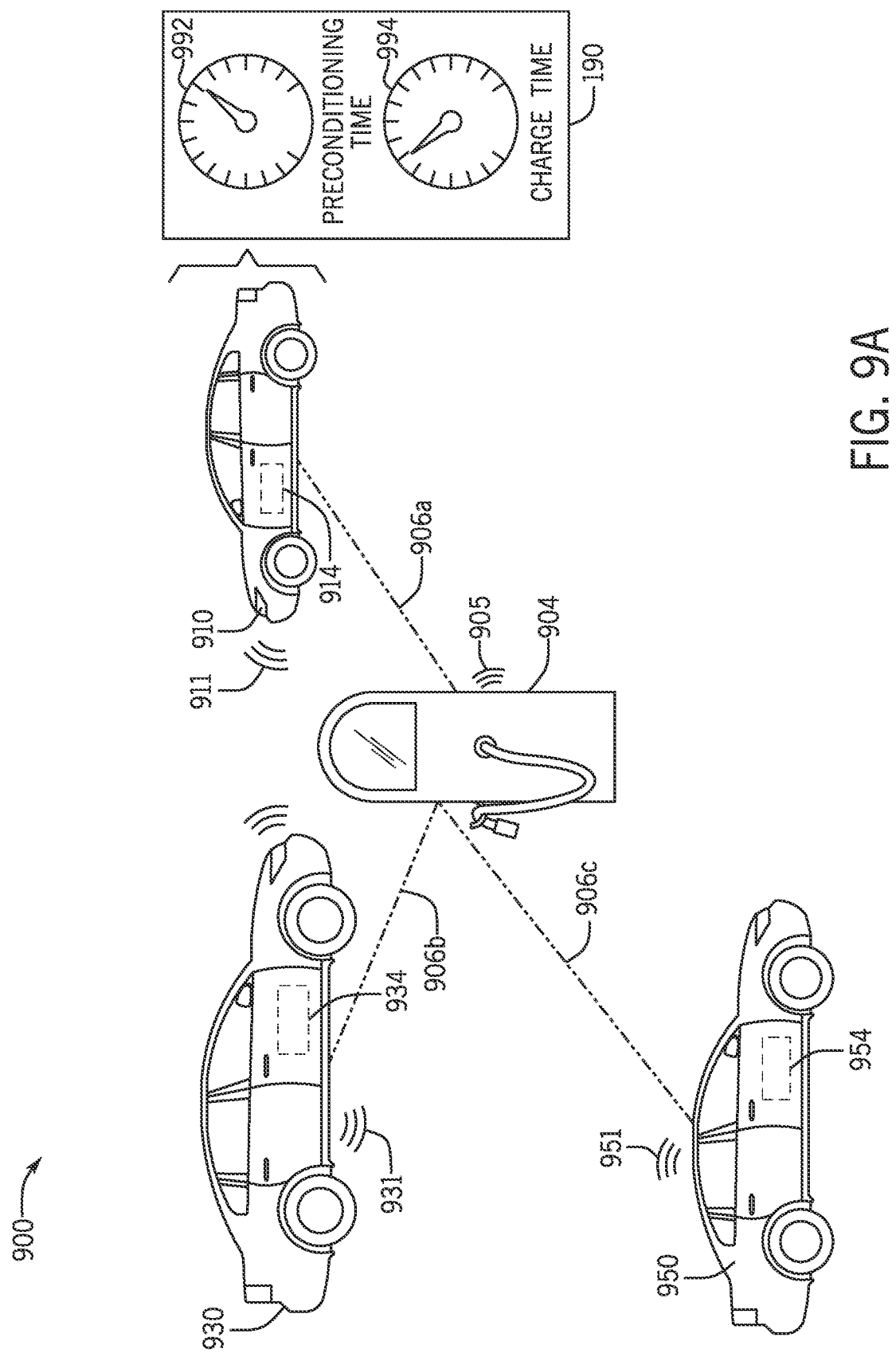
FIG. 9A depicts a schematic view of another system including vehicles traveling to a charging station.
Figure 9B:
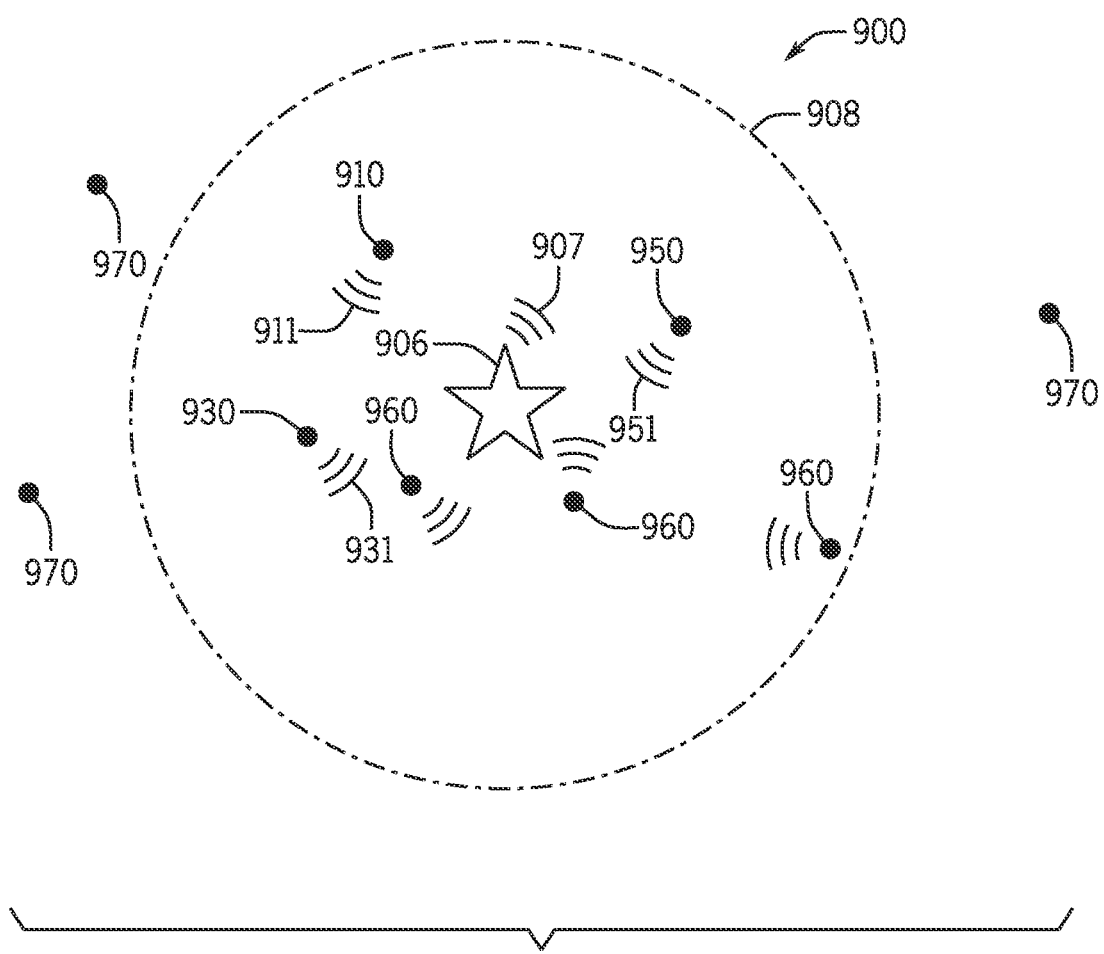
FIG. 9B depicts a schematic view of a mesh network of the vehicles of FIG. 9A.

To illustrate, FIG. 9A shows a multi-vehicle system 900. The multi-vehicle system 900 may be substantially analogous to the multi-vehicle system 100 of FIG. 1A in that the system 100 includes multiple electric vehicles en route to a common charging station (or group of charging stations at a charging depot). In this regard, FIG. 9A depicts a charging station 904, a charging station signal 905, a first vehicle 910, a first battery 914, a first vehicle route 906a, a second vehicle 930, a second battery 934, a second vehicle route 906b, a third vehicle 950, a third battery 954, a third vehicle route 906c, vehicle metrics 190, a preconditioning time 992, and a charge time 994; redundant explanation of which is omitted for clarity.

Notwithstanding the foregoing similarities, FIG. 9A shows a first signal 911, a second signal 931, and a third signal 951. The signals 911, 931, 951 may be signals transmitted and received between and among vehicles of the multi-vehicle system 900. For example, each of the vehicles 910, 930, 950 may function as nodes of the mesh network. Each vehicle may be operable to transmit a respective signal to other nodes of the mesh network. The mesh network may allow the vehicles to send and receive signals with one another in a dynamic and non-hierarchical manner. The signals may be associated with preconditioning characteristics of the vehicles. For example, a given vehicle may transmit information associated with a preconditioning characteristic of the vehicle to other vehicles of the system or other vehicles within a certain proximity range of the signal-originating vehicle. As described herein, other vehicles may receive the information regarding the preconditioning characteristic and use this information to determine a queue for the charging station.

In some cases, the information associated with the preconditioning characteristic may be transmitted or broadcast periodically. In one example, the information may be broadcast to other vehicles within a range of an identified charging station. For example, and as shown in the schematic top view of the multi-vehicle system 900 presented in FIG. 9B, a range 908 may be defined relative to the charging station 906. The vehicles 910, 930, 950 may be configured to transmit and/or relay information associated with the preconditioning characteristic to vehicles within the range 908. In this regard, additional vehicles 960 may also receive signals from the vehicles 910, 930, 950. This may allow any or all vehicles within the range 908 to join the priority ranking and/or queue for the charging station 906. Vehicles 970 outside the range 908 may not be eligible and may not receive the signals from the vehicles within the range 908. In one example, the range 908 may be defined with respect to a predetermined radius relative to the charging station 906. In other cases, the range 908 may be extendable by each vehicle of the network. In this regard, vehicles may help extend the communication network for additional charging stations as well. This may allow a first vehicle heading to a charging station A, for example, to communicate to other vehicles heading to charging stations B and C, as needed, to extend the network.

Figure 10:
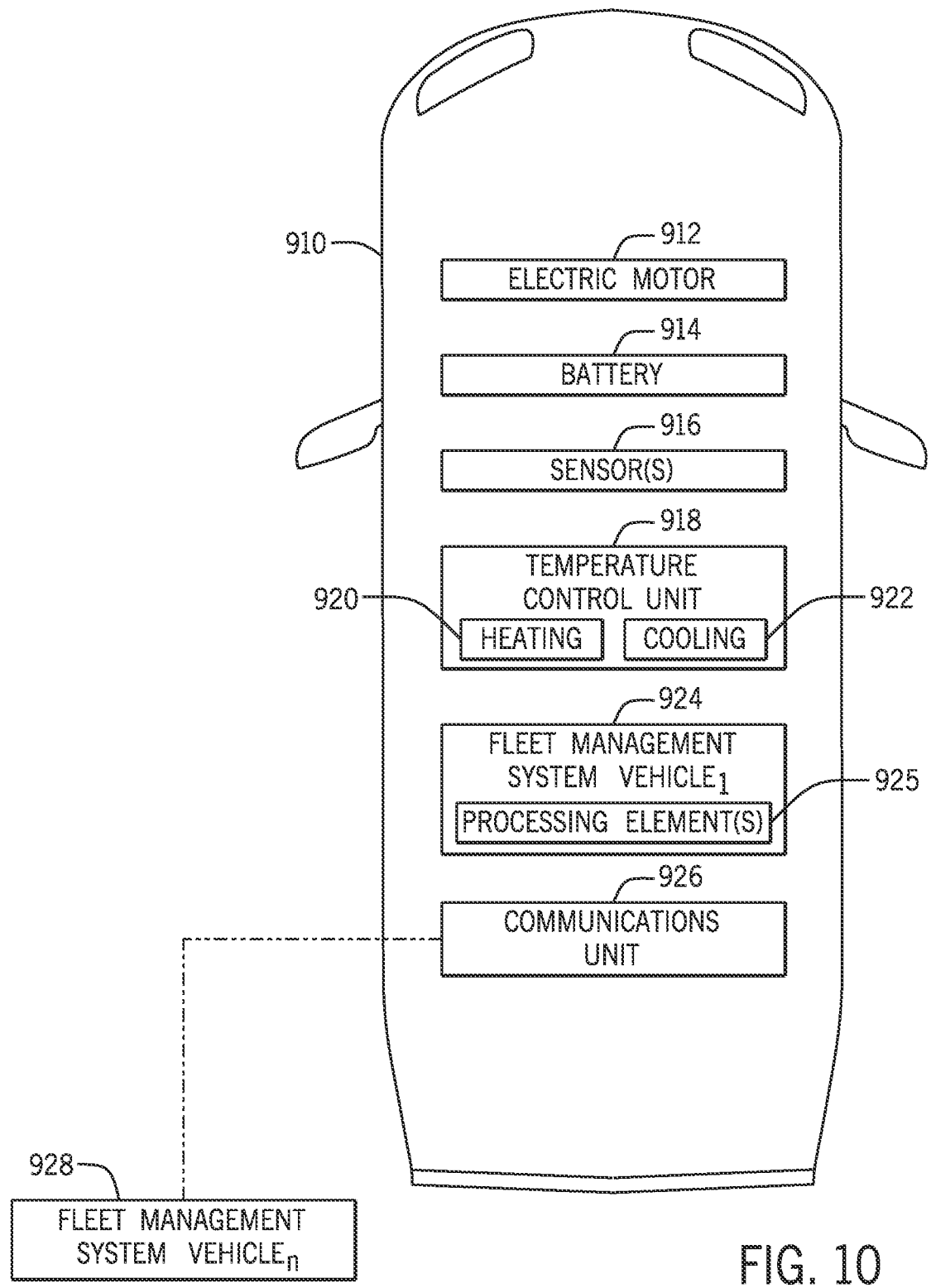
FIG. 10 depicts a functional diagram of another vehicle including an electric motor and a battery.

With reference to FIG. 10, example components of the vehicle 910 are shown. The vehicle 910 may be substantially analogous to the vehicle 110 described above in relation to FIG. 4 and include an electric motor 912, the battery 914, sensor(s) 916, a temperature control unit 918, a heating module 920, a cooling module 922, processing element 925, and a communications unit 926; redundant explanation of which is omitted here for clarity.

Notwithstanding the foregoing similarities, the vehicle 910 is shown as including a fleet management system 924. The fleet management system 924 may be substantially analogous to any of the fleet management systems described herein, such as the fleet management system 180 of FIG. 1B and the fleet management system 200 of FIG. 2. The fleet management system 924 of FIG. 10 is shown as a functional element of the vehicle 910. The fleet management system 924 may be executed by the processing element(s) 925 of the vehicle 910. In this regard, some or all of the functions of the fleet management systems described here may be performed by components of the first vehicle 910. The fleet management system 924 is illustrated in FIG. 10 as being associated with a first vehicle in the mesh network (i.e., $VEHICLE_1$).

As is further shown in FIG. 10, the first vehicle 910 may be communicatively coupled with a fleet management system 928. The fleet management system 928 may be substantially analogous to the fleet management system 924. For example, the fleet management system 928 may be executed by one or more processing elements of one or more other vehicles of the multiple vehicle system, such as the second vehicle 930 or the third vehicle 950. In some cases, the fleet management system 928 may be executed by one or more processing elements or a remote server, similar to the example of FIG. 2. Thus, fleet management system 928 is illustrated in FIG. 10 as being associated with another vehicle in the network or area (i.e., $VEHICLE_n$, which can refer to any of the other interconnected vehicles described above (e.g., vehicle 930 or 950)).

The fleet management system 924 of the first vehicle 910 and the fleet management system 928 external to the first vehicle may cooperate to determine a priority ranking or queue for the charging station 906. For example, the fleet management system 924 may determine a first preconditioning characteristic of the first vehicle 910. The fleet management system 924 may cause the first preconditioning characteristic to be transmitted across the mesh network. Similarly, the fleet management system 924 may determine a second preconditioning characteristic of the second vehicle 930 in response to receiving information about the second vehicle through the fleet management system of the second vehicle (or another vehicle having information associated with the second vehicle). The fleet management system 928 may cause the second preconditioning characteristic to be transmitted across the network. In some embodiments, the first vehicle 910 may receive the second preconditioning characteristic via the communications unit 926, and provide the second preconditioning characteristic to the fleet management system 924. The fleet management system 924 may then determine a priority ranking and/or queue for the first and second vehicles, as described herein in relation to FIG. 2. For example, the fleet management system 924, among other functions, may compare the first preconditioning characteristic and the second preconditioning characteristic to determine a preconditioning ranking for the first vehicle and the second vehicle. The fleet management system 924 may further determine a queue of the first and second vehicles for the charging station 104 using the preconditioning ranking of the first and second vehicles and/or an override priority.

Figure 11:
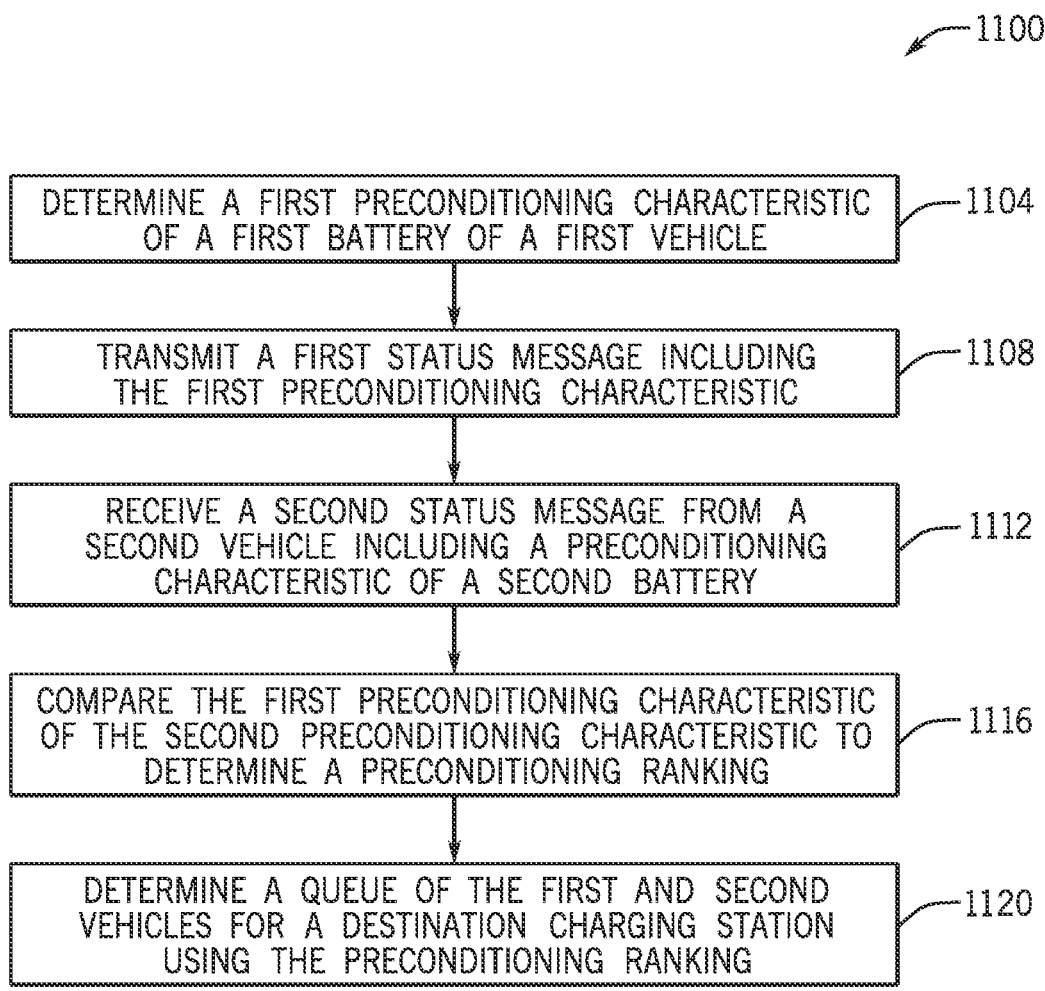
FIG. 11 depicts a flow diagram for controlling battery preconditioning in a vehicle.
Figure 12:
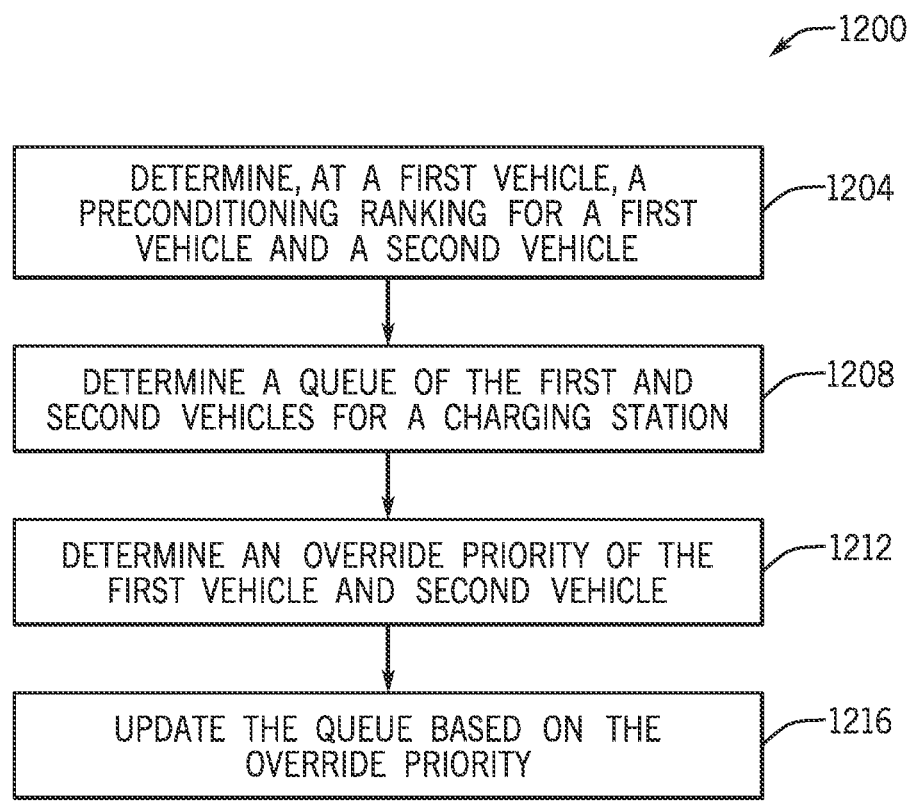
FIG. 12 depicts another flow diagram for controlling battery preconditioning in a vehicle.

To facilitate the reader's understanding of the various functionalities of the embodiments discussed herein, reference is now made to the flow diagram in FIGS. 11 and 12, which illustrate processes 1100 and 1200, respectively. While specific steps (and orders of steps) of the methods presented herein have been illustrated and will be discussed, other methods (including more, fewer, or different steps than those illustrated) consistent with the teachings presented herein are also envisioned and encompassed with the present disclosure.

With reference to FIG. 11, a method of controlling battery preconditioning in a vehicle is disclosed. At operation 1104, a first preconditioning characteristic of a first battery of a first vehicle is determined relative to a charging station. For example, with reference to FIGS. 9A and 10, the fleet management system 924 may operate to determine the first preconditioning characteristic for the first vehicle 910. The fleet management system 924 may determine the first preconditioning characteristic according to any of the techniques described herein.

At operation 1108, the first preconditioning characteristic is transmitted. For example, and with reference to FIGS. 9A-10, the fleet management system 924 may cause the first precondition characteristic to be transmitted across the multi-vehicle system 900. In some cases, the preconditioning characteristic may be transmitted to one or more or all vehicles within the range 908. In some embodiments, the characteristic may be transmitted to vehicles within a communications radius centered at the vehicle itself instead of being centered at the charging station.

At operation 1112, a second preconditioning characteristic of a second battery relative to the charging station is received from a second vehicle. For example, and with reference to FIGS. 9A-10, the fleet management system 924 may receive a second preconditioning characteristic of the second battery 934 of the second vehicle 930. In some cases, the fleet management system 928 may determine the second preconditioning characteristic and broadcast the second preconditioning characteristic to vehicles with the range 908, such as the first vehicle 910.

At operation 1116, the first preconditioning characteristic and the second preconditioning characteristic are compared to determine a preconditioning ranking for the first vehicle and the second vehicle. For example, and with reference to FIG. 10, the fleet management system 924 may compare the first and second preconditioning characteristics. The fleet management system 924 may compare the first and second preconditioning characteristics in order to determine which of the first and second vehicle requires the least amount of time to recharge the respective vehicles battery at a charging station after a preconditioning operation.

At operation 1120, a queue of the first and second vehicles for the charging station is determined using the preconditioning ranking of the first and second vehicles. For example, with reference to FIG. 10, the fleet management system 924 may determine a queue for the charging station based on the ranking preconditioning characteristics. In some cases, the fleet management system 924 may additionally reorder or rearrange the order of the vehicles at the charging station, for example, based on other factors, such as the priority ranking, described herein.

Additionally, the fleet management system 924 may communicate the determined priority ranking and/or queue to other vehicles of the multi-vehicle system 900 and/or to the charging station 906. For example, the fleet management system 924 may cause the communications unit 926 to broadcast a signal to other vehicles regarding the priority ranking or queue, as determined by the first vehicle 910. The second vehicle 930 and/or other vehicles of the multi-vehicle system may also broadcast the determination of the queue, as determined by at least one vehicle, to other vehicles of the network. This exchange of priority rankings and queue determinations may allow vehicles in the multi-vehicle system to validate the determinations and resolve discrepancies therebetween. As an illustration, where two vehicles reach different queue determinations, the queue determinations of other vehicles of the multi-vehicle system may be considered in the aggregate to validate the queue determination of one of the vehicles. The validated queue may then be propagated to other vehicles of the network and/or the charging station 906.

With reference to FIG. 12, another method of controlling battery preconditioning in a vehicles is disclosed. At operation 1204, a preconditioning ranking for the first vehicle and a second vehicles are determined, at a first vehicle, by comparing a first preconditioning characteristic of a first battery of the first vehicle and a second preconditioning characteristic of a second battery of a second vehicle. For example, and with reference to FIGS. 9A-10, the fleet management system 924 may compare the first and second preconditioning characteristics. The fleet management system 924 may compare the first and second preconditioning characteristics in order to determine which of the first and second vehicle requires the least amount of time to recharge the respective vehicles battery at a charging station after a preconditioning operation.

At operation 1208, a queue of the first and second vehicles for a charging station is determined using the preconditioning ranking of the first and second vehicles. For example, and with reference to FIGS. 9A-10, the fleet management system 924 may determine a queue for the charging station based on the ranked preconditioning characteristics. In the example of operation 1208, the queue may generally be the same as the priority ranking determined at the operation 1204 based on the preconditioning characteristics.

At operation 1212, an override priority of the first vehicle and second vehicle is determined. For example, and with reference to FIGS. 9A-10, the fleet management system 924 may determine an override priority for the queue. In one example, the fleet management system 924 may determine an override priority based on an input from a user, such as a fleet manager, to increase or decrease the priority of a vehicle within the queue. In other cases, the presence or absence of certain vehicle types may trigger a set of rules that prompt a reordering of vehicles in the queue. At operation 1216, the queue is updated based on the override priority. For example, and with reference to FIGS. 9A-10, the fleet management system 924 may update the queue in order to change the order of vehicles for charging at the charging station based on the override priority.

Figure 13:
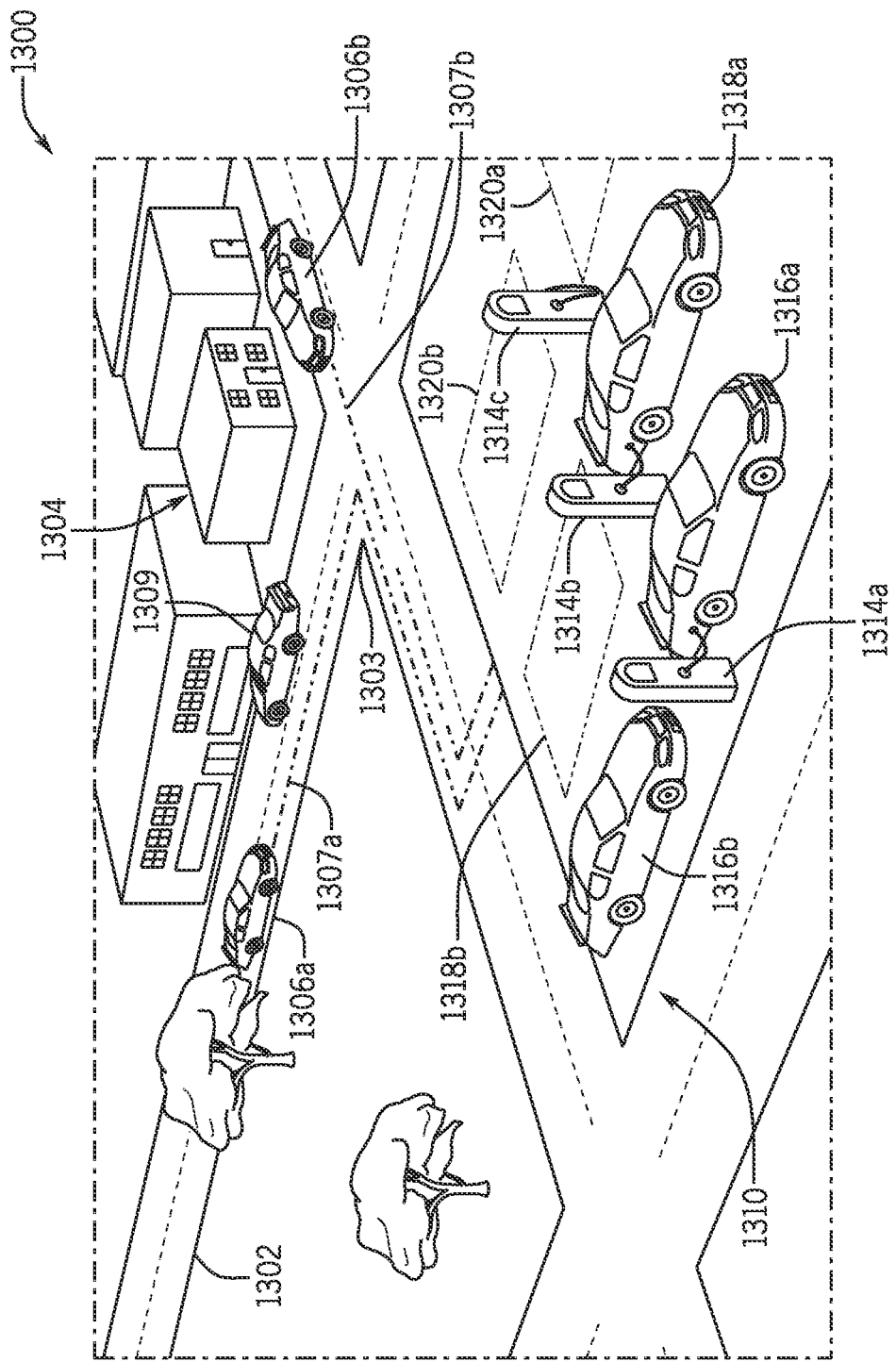
FIG. 13 depicts a system in which multiple vehicles are en route to charging stations.

The systems and techniques described herein may be used to determine a priority ranking and/or a queue for vehicles of a multi-vehicle system en route to a group of charging stations. For example, FIG. 13 depicts a multi-vehicle system 1300 in which multiple vehicles, such as a first vehicle 1306*a* and a second vehicle 1306*b*, are en route to a charging depot 1310. The charging depot 1310 may include a first charging station 1314*a*, a second charging station 1314*b*, and a third charging station 1314*c*. The systems and techniques described herein may be configured to determine the priority ranking and/or queue based, in part, on an availability of the charging stations 1314*a*-1314*c* for charging in addition to the preconditioning characteristics described herein. In this regard, an electric vehicle may initiate preconditioning of a battery of vehicle at a time such that the conclusion of the preconditioning operation substantially coincides with the time at which a charging station becomes available for charging a vehicle.

For purpose of illustration, the multi-vehicle system 1300 is shown in FIG. 13 as including a roadway network 1302, an intersection 1303, an environment 1304, and traffic 1309. The first and second vehicles 1306*a*, 1306*b* may navigate these and other conditions en route to the charging depot 1310. As described herein, a fleet management system, operating remotely and/or partially or fully internally on one of the vehicles, may facilitate the preconditioning of the vehicle's battery at least partially based on these and other factors, referred to herein as route-based preconditioning factors. Additionally, the fleet management system may be configured to determine a priority ranking and/or queue for the vehicles 1306*a*, 1306*b* based on the preconditioning factors, as described herein. Further, and as illustrated in FIG. 13, the fleet management system may be configured to determine, update, or modify a priority ranking or queue based on the availability of the charging stations 1314*a*-1314*c* of the charging depot 1310.

By way of illustration, the first charging station 1314*a* is shown charging a charging vehicle 1316*a*. A waiting vehicle 1316*b* is shown waiting for the first charging station 1314*a* to become available for charging. The waiting vehicle 1316*b* may be waiting for the first charging station 1314*a* (as opposed to charging at the otherwise available third charging station 1314*c*) for example due to an override priority, such as one of the first or second vehicles 1306*a*, 1306*b* having priority at the third charging station 1314*c*, based on the systems and techniques described herein. The second charging station 1314*b* is shown charging a charging vehicle 1318*a*. A waiting spot 1318*b* is indicated relative to the second charging station 1314*b* at which a vehicle may wait for the second charging station 1314*b* to become available. The third charging station 1314*c* is shown with a charging spot 1320*a* indicated at which a vehicle may park while using the third charging station 1314*a*. A waiting spot 1320*b* is shown relative to the third charging station 1314*c* at which a vehicle may wait for the charging station 1314*c* to become available (while the third charging station 1314*c* is in use).

The fleet managements systems described herein may update the queue based on the availability of the charging stations 1314*a*-1314*c*. For example, the fleet management system may assign one of the first or second vehicles 1306*a*, 1306*b* to the third charging station 1314*c* since the third charging station 1314*c* in the example of FIG. 13 is not occupied by a charging vehicle. In one instance, the feet management system may analyze a depot travel route or depot path 1307*a* of the first vehicle 1306*a* to the charging depot 1310 and a depot path 1307*b* of the second vehicle 1306*b* to the charging depot 1310. The fleet management system may determine which of the first or second vehicles 1306*a*, 1306*b* may arrive at the charging depot first and may assign this vehicle to an available charging station. Further, the fleet management system may analyze the preconditioning characteristic of the first and second vehicles 1306a, 1306b and assign the vehicle to a charging station based on a preconditioning time of the vehicles occurring at a time substantially coinciding with a time of availability of the charging station, as described in greater detail above with respect to FIG. 6.

In the multi-charging station system of FIG. 13, assigning vehicles to charging stations based on preconditioning may result in assigning vehicles to an occupied charging station (e.g., a station occupied by at least one vehicle that is charging) even though other charging stations remains available for charging. As an illustration, the first vehicle 1306a may arrive at the charging depot 1310 before the second vehicle 1306b, and therefore, absent consideration of preconditioning, a system may assign the first vehicle to the third charging station 1320a, as it is available and ready for use in charging a vehicle. The second vehicle 1306b, which arrives at the charging depot 1310 at a later time, would then wait for one of the charging stations 1314a-1314c to become available. Prior to making such determination, the fleet management system of the present disclosure may analyze the preconditioning characteristics of the first and second vehicles 1306a and 1306b to determine the assignment of the first and second vehicles 1306a, 1306b that results in returning the vehicles 1306a, 1306b to serve most efficiently, in light of the requirement to precondition the vehicle's battery. For example, the fleet management system may determine that despite the first vehicle 1306a arriving at the charging depot 1310 sooner, the first vehicle 1306a requires a prolonged period of preconditioning before the first vehicle 1306a can begin charging. As such, rather than assign the first vehicle 1306a to the third charging station 1314c, the fleet management system may assign the first vehicle 1306a to the second charging station 1314b. In this manner, the first vehicle 1306a may wait at the waiting spot 1318b during a preconditioning operation. In some cases, the preconditioning operation of the first vehicle 1306a may be tuned such that the battery reaches a target preconditioning temperature at a time that substantially coincides with the conclusion of the second charging station 1314b charging the charging vehicle 1318a. This assignment of the first vehicle 1306a and the second charging station 1314b then leaves the third charging station 1314c available for charging the later-arriving second vehicle 1306b, which may already have a substantially preconditioned battery upon arrival at the charging depot 1310 and thus can use the third charging station 1314c. In other cases, other arrangements and assignments are possible and contemplated herein.

Figure 14:
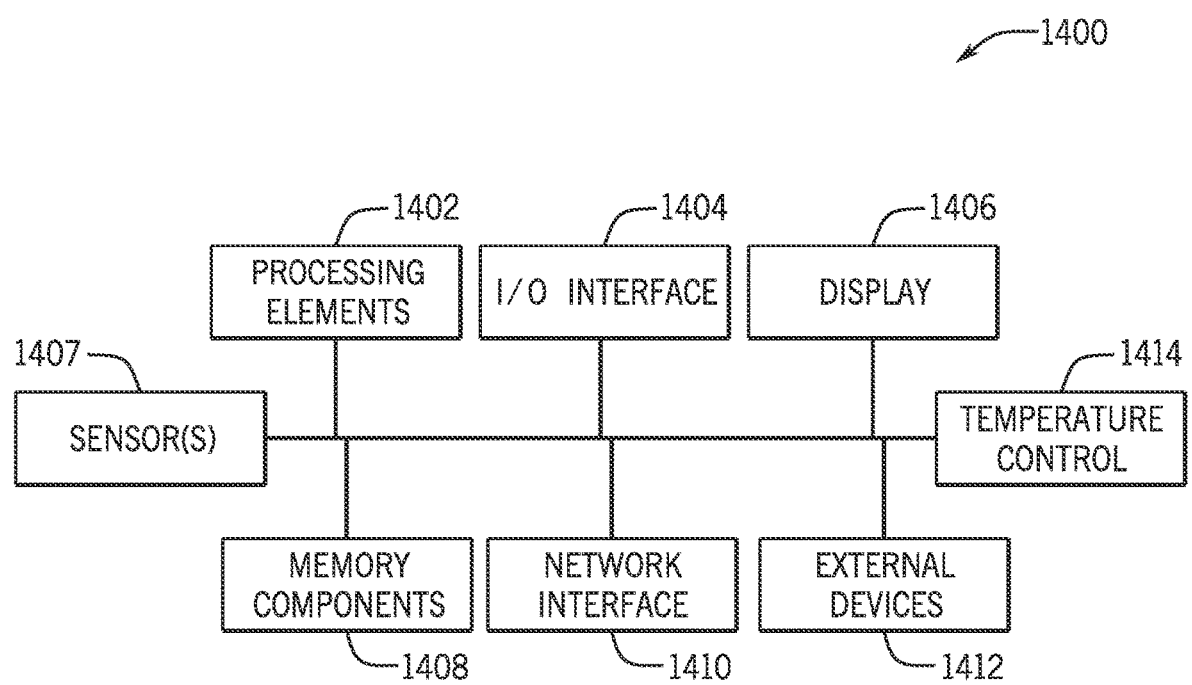
FIG. 14 depicts an example schematic diagram of a computer system for implementing various techniques in the examples described herein.

FIG. 14 depicts an example schematic diagram of a computer system 1400 for implementing various techniques in the examples described herein. A computer system 1400 may be used to implement the fleet management system 200 (FIG. 2) or integrated into one or more components of the vehicles 110, 130, 150 or other system, which may be remote from the vehicles 110, 130, 150. More generally, the computer system 1400 is used to implement or execute one or more of the components or operations disclosed in FIGS. 1-13. In FIG. 14, the computer system 1400 may include one or more processing elements 1402, an input/output interface 1404, a display 1406, sensor(s) 1407, one or more memory components 1408, a network interface 1410, one or more external devices 1412, and a temperature control device 1414. Each of the various components may be in communication with one another through one or more buses, communication networks, such as wired or wireless networks.

The processing element 1402 may be any type of electronic device capable of processing, receiving, and/or transmitting instructions. For example, the processing element 1402 may be a central processing unit, microprocessor, processor, or microcontroller. Additionally, it should be noted that some components of the computer system 1400 may be controlled by a first processor and other components may be controlled by a second processor, where the first and second processors may or may not be in communication with each other.

The memory components 1408 are used by the computer system 1400 to store instructions for the processing element 1402, as well as store data, such as data from various vehicles regarding associated preconditioning characteristics (FIG. 5A) and the like. The memory components 1408 may be, for example, magneto-optical storage, read-only memory, random access memory, erasable programmable memory, flash memory, or a combination of one or more types of memory components.

The display 1406 provides visual feedback to a user. Optionally, the display 1406 may act as an input element to enable a user to control, manipulate, and calibrate various components of the fleet management system 200 and/or vehicle 110, 130, 150. The display 1406 may be a liquid crystal display, plasma display, organic light-emitting diode display, and/or other suitable display. In embodiments where the display 1406 is used as an input, the display may include one or more touch or input sensors, such as capacitive touch sensors, a resistive grid, or the like.

The I/O interface 1404 allows a user to enter data into the computer system 1400, as well as provides an input/output for the computer system 1400 to communicate with other devices or services. The I/O interface 1404 can include one or more input buttons, touch pads, and so on.

The computer system 1400 may also include one or more sensors 1407 that may be used to detect a touch and/or force input, environmental condition, orientation, position, or some other aspect of the computer system 1400. In this regard, the sensors 1407 may be used to detect an input at a touch-sensitive display (e.g., display 1406) and/or other surface or feature, such as an external surface of the computer system 1400 defined by an outer enclosure or shell. Example sensors 1407 include, without limitation, one or more accelerometers, gyrometers, inclinometers, goniometers, or magnetometers. The sensors 1407 may also include one or more proximity sensors, such as a magnetic hall-effect sensor, inductive sensor, capacitive sensor, continuity sensor, or the like. Resistive and contact-based sensors may also be used.

The network interface 1410 provides communication to and from the computer system 1400 to other devices. The network interface 1410 includes one or more communication protocols, such as, but not limited to WiFi, Ethernet, Bluetooth, and so on. The network interface 1410 may also include one or more hardwired components, such as a Universal Serial Bus (USB) cable, or the like. The configuration of the network interface 1410 depends on the types of communication desired and may be modified to communicate via WiFi, Bluetooth, and so on. The external devices 1412 are one or more devices that can be used to provide various inputs to the computer system 1400, e.g., mouse, microphone, keyboard, trackpad, or the like.

The external devices 1412 may be local or remote and may vary as desired. In some examples, the external devices 1412 may also include one or more additional sensors. The temperature control device 1414 may be substantially analogous to the temperature control unit 118 of FIG. 4; redundant explanation of which is omitted here for clarity.

The foregoing description has a broad application. For example, while examples disclosed herein may focus on central communication system, it should be appreciated that the concepts disclosed herein may equally apply to other systems, such as a distributed, central or decentralized system, or a cloud system. For example, some components may reside on a server in a client/server system, on a user mobile device, or on any device on the network and operate in a decentralized manner. One or more components of the systems may also reside in a controller virtual machine (VM) or a hypervisor in a VM computing environment. Accordingly, the disclosure is meant only to provide examples of various systems and methods and is not intended to suggest that the scope of the disclosure, including the claims, is limited to these examples.

The technology described herein may be implemented as logical operations and/or modules in one or more systems. The logical operations may be implemented as a sequence of processor-implemented steps directed by software programs executing in one or more computer systems and as interconnected machine or circuit modules within one or more computer systems, or as a combination of both. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology may be employed in special purpose devices independent of a personal computer.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and Band C). Further, the term "exemplary" does not mean that the described example is preferred or better than other examples.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method of controlling battery preconditioning in a vehicle, the method comprising:
   determining a first preconditioning characteristic of a first battery of a first vehicle relative to a charging station;
   transmitting the first preconditioning characteristic to a second vehicle;
   receiving, from the second vehicle, a second preconditioning characteristic of a second battery relative to the charging station;
   comparing the first preconditioning characteristic and the second preconditioning characteristic to determine a preconditioning ranking for the first vehicle and the second vehicle; and
   determining a queue of the first and second vehicles for the charging station using the preconditioning ranking of the first and second vehicles.

2. The method of claim 1, further comprising transmitting a first queue confirmation message comprising information indicative of the queue determined by the first vehicle.

3. The method of claim 2, further comprising
   receiving a second queue confirmation message from the second vehicle, the second queue confirmation message comprising information indicative of a queue determined by the second vehicle, and
   resolving a discrepancy between the queue determined by the first vehicle and the queue determined by the second vehicle.

4. The method of claim 1, wherein
   the preconditioning ranking of the first vehicle corresponds to the first vehicle having a higher priority over the second vehicle for usage of the charging station, and
   the method further comprises causing the first vehicle to initiate a preconditioning operation for the first battery before the second vehicle initiates a preconditioning operation for the second battery.

5. The method of claim 1, wherein:
   the first or second preconditioning characteristic is indicative of a minimum amount of time required to recharge the respective first or second battery at the charging station after a preconditioning operation, and
   the determining of the preconditioning ranking comprises:
      in response to the first preconditioning characteristic being less than the second preconditioning characteristic, determining the preconditioning ranking of the first vehicle is prioritized over the preconditioning ranking of the second vehicle, and
      in response to the second preconditioning characteristic being less than the first preconditioning characteristic, determining the preconditioning ranking of the second vehicle is prioritized over the preconditioning ranking of the first vehicle.

6. The method of claim 5, wherein the first or the second preconditioning ranking comprises a preconditioning time of the respective first or second battery, an estimated time of arrival of the respective first or second vehicle to the charging station, or an estimated charge time of the respective first or second battery.

7. The method of claim 1, wherein transmitting the first preconditioning characteristic comprises transmitting the first preconditioning characteristic to a plurality of additional vehicles within a predetermined radius of the charging station.

8. The method of claim 1, wherein the first preconditioning characteristic is transmitted periodically.

9. The method of claim 1, wherein:
the second vehicle is a charging vehicle at the charging station, and the second preconditioning characteristic is accompanied by information indicative of a time to complete a charging of the second battery at the charging station, and
the method further comprises causing the first vehicle to initiate a preconditioning of the first battery based on the information indicative of the time to complete the charging of the second battery.

10. The method of claim 1, further comprising applying a set of override rules to the queue to modify the queue determined by the first vehicle.

11. A system comprising:
a plurality of vehicles communicatively coupled over a mesh network, one or more vehicles of the plurality of vehicles having a battery;
a charging station configured to charge the battery of the one or more vehicles; and
a fleet management system operated by a first vehicle of the plurality of vehicles and comprising a non-transitory computer-readable medium encoded with instructions which, when executed by one or more processing elements of the fleet management system, cause the system to:
determine a first preconditioning characteristic of a first battery of the first vehicle relative to the charging station;
receive, from a second vehicle, a second preconditioning characteristic of a second battery relative to the charging station; and
determine a queue of the first and second vehicles for the charging station using the preconditioning ranking of the first and second vehicles;
wherein the one or more processing elements and the non-transitory computer-readable medium are positioned on the first vehicle of the plurality of vehicles.

12. The system of claim 11, wherein:
the instructions further cause the system to compare the first preconditioning characteristic and the second preconditioning characteristic to determine a preconditioning ranking, and
determining the queue further comprises using the preconditioning ranking to prioritize the first or the second vehicle at the charging station.

13. The system of claim 11, wherein the instructions further cause the system to:
determine an override priority of the first vehicle and second vehicle; and
update the queue based on the override priority.

14. The system of claim 13, wherein updating the queue comprises prioritizing usage of the charging station for the one of the first vehicle or the second vehicle with a higher override priority, notwithstanding the respective preconditioning ranking of the first and second vehicles.

15. The system of claim 13, wherein determining the override priority further comprises applying a set of hardcoded rules to the queue.

16. A method of controlling battery preconditioning in a vehicle, the method comprising:
determining, at a first vehicle, a preconditioning ranking for the first vehicle and a second vehicle by comparing a first preconditioning characteristic of a first battery of the first vehicle and a second preconditioning characteristic of a second battery of the second vehicle;
determining a queue of the first and second vehicles for a charging station using the preconditioning ranking of the first and second vehicles;
determining an override priority of the first vehicle and second vehicle by applying a set of hardcoded rules to the queue; and
updating the queue based on the override priority.

17. The method of claim 16, further comprising receiving the second preconditioning characteristic from the second vehicle.

18. The method of claim 17, further comprising receiving routing factors from the second vehicle comprising traffic information, battery consumption information, and temperature information associated with the second vehicle.

19. The method of claim 18, further comprising determining the first preconditioning characteristic using the received routing factors from the second vehicle.

* * * * *